US008928025B2

(12) United States Patent
Simon et al.

(10) Patent No.: US 8,928,025 B2
(45) Date of Patent: Jan. 6, 2015

(54) LED LIGHTING APPARATUS WITH SWIVEL CONNECTION

(75) Inventors: David L. Simon, Grosse Pointe Woods, MI (US); John Ivey, Farmington Hills, MI (US)

(73) Assignee: iLumisys, Inc., Troy, MI (US)

( * ) Notice: Subject to any disclaimer, the term of this patent is extended or adjusted under 35 U.S.C. 154(b) by 0 days.

(21) Appl. No.: 13/343,766

(22) Filed: Jan. 5, 2012

(65) Prior Publication Data

US 2012/0099322 A1 Apr. 26, 2012

Related U.S. Application Data

(62) Division of application No. 11/961,701, filed on Dec. 20, 2007, now Pat. No. 8,118,447.

(51) Int. Cl.

| | |
|---|---|
| ***H01L 33/00*** | (2010.01) |
| ***F21K 99/00*** | (2010.01) |
| *F21V 19/02* | (2006.01) |
| *F21Y 101/02* | (2006.01) |
| *F21Y 103/00* | (2006.01) |

(52) U.S. Cl.

CPC . *F21K 9/175* (2013.01); *F21K 9/58* (2013.01); *A21V 14/02* (2013.01); *F21V 19/02* (2013.01); *F21Y 2101/02* (2013.01); *F21Y 2103/003* (2013.01)

USPC ........................ 257/99; 257/81; 257/E33.058

(58) Field of Classification Search

USPC ...................................... 257/99, 81, E33.058

See application file for complete search history.

(56) References Cited

U.S. PATENT DOCUMENTS

| | | | |
|---|---|---|---|
| D54,511 | S | 2/1920 | Owen |
| D58,105 | S | 6/1921 | Poritz |
| D79,814 | S | 11/1929 | Hoch |
| D80,419 | S | 1/1930 | Kramer |
| D84,763 | S | 7/1931 | Stange |

(Continued)

FOREIGN PATENT DOCUMENTS

| | | |
|---|---|---|
| CN | 1584388 A | 2/2005 |
| CN | 2766345 Y | 3/2006 |

(Continued)

OTHER PUBLICATIONS

Notification of Transmittal, the International Search Report and the Written Opinion of the International Searching Authority dated May 7, 2012, from the corresponding International Application No. PCT/US2011/064151.

(Continued)

*Primary Examiner* — Dale E Page

(74) *Attorney, Agent, or Firm* — Young Basile

(57) ABSTRACT

Disclosed is a LED lighting apparatus with one or more swivel connections. The LED lighting apparatus includes a housing with at least one end, at least one light emitting diode extending along the housing and at least one end cap. The end cap has an opening with a sidewall to cap the end of the housing and a surface opposite the opening and spanning the sidewall. At least two pin connectors extend from the surface and are connectable to a standard fluorescent or incandescent light fixture. Various configurations are described such that the housing will rotate within the end caps with application of a rotational force after connection of the pin connectors to the light fixture to adjust the light output direction of the LED lighting apparatus.

20 Claims, 3 Drawing Sheets

(56) References Cited

U.S. PATENT DOCUMENTS

| | | | |
|---|---|---|---|
| D119,797 | S | 4/1940 | Winkler et al. |
| D125,312 | S | 2/1941 | Logan |
| 2,826,679 | A | 3/1958 | Rosenberg |
| 2,909,097 | A | 10/1959 | Alden et al. |
| 3,272,977 | A | 9/1966 | Holmes |
| 3,318,185 | A | 5/1967 | Kott |
| 3,561,719 | A | 2/1971 | Grindle |
| 3,586,936 | A | 6/1971 | McLeroy |
| 3,601,621 | A | 8/1971 | Ritchie |
| 3,612,855 | A | 10/1971 | Juhnke |
| 3,643,088 | A | 2/1972 | Osteen et al. |
| 3,739,336 | A | 6/1973 | Burland |
| 3,746,918 | A | 7/1973 | Drucker et al. |
| 3,818,216 | A | 6/1974 | Larraburu |
| 3,821,590 | A | 6/1974 | Kosman et al. |
| 3,832,503 | A | 8/1974 | Crane |
| 3,858,086 | A | 12/1974 | Anderson et al. |
| 3,909,670 | A | 9/1975 | Wakamatsu et al. |
| 3,924,120 | A | 12/1975 | Cox, III |
| 3,958,885 | A | 5/1976 | Stockinger et al. |
| 3,969,720 | A | 7/1976 | Nishino |
| 3,974,637 | A | 8/1976 | Bergey et al. |
| 3,993,386 | A | 11/1976 | Rowe |
| 4,001,571 | A | 1/1977 | Martin |
| 4,009,394 | A | 2/1977 | Mierzwinski |
| 4,054,814 | A | 10/1977 | Fegley et al. |
| 4,070,568 | A | 1/1978 | Gala |
| 4,082,395 | A | 4/1978 | Donato et al. |
| 4,096,349 | A | 6/1978 | Donato |
| 4,102,558 | A | 7/1978 | Krachman |
| 4,107,581 | A | 8/1978 | Abernethy |
| 4,189,663 | A | 2/1980 | Schmutzer et al. |
| 4,211,955 | A | 7/1980 | Ray |
| 4,241,295 | A | 12/1980 | Williams, Jr. |
| 4,257,672 | A | 3/1981 | Balliet |
| 4,261,029 | A | 4/1981 | Mousset |
| 4,262,255 | A | 4/1981 | Kokei et al. |
| 4,271,408 | A | 6/1981 | Teshima et al. |
| 4,271,458 | A | 6/1981 | George, Jr. |
| 4,272,689 | A | 6/1981 | Crosby et al. |
| 4,273,999 | A | 6/1981 | Pierpoint |
| 4,298,869 | A | 11/1981 | Okuno |
| 4,329,625 | A | 5/1982 | Nishizawa et al. |
| 4,339,788 | A | 7/1982 | White et al. |
| 4,342,947 | A | 8/1982 | Bloyd |
| 4,344,117 | A | 8/1982 | Niccum |
| 4,367,464 | A | 1/1983 | Kurahashi et al. |
| D268,134 | S | 3/1983 | Zurcher |
| 4,382,272 | A | 5/1983 | Quella et al. |
| 4,388,567 | A | 6/1983 | Yamazaki et al. |
| 4,388,589 | A | 6/1983 | Molldrem, Jr. |
| 4,392,187 | A | 7/1983 | Bornhorst |
| 4,394,719 | A | 7/1983 | Moberg |
| 4,420,711 | A | 12/1983 | Takahashi et al. |
| 4,455,562 | A | 6/1984 | Dolan et al. |
| 4,500,796 | A | 2/1985 | Quin |
| 4,521,835 | A | 6/1985 | Meggs et al. |
| 4,531,114 | A | 7/1985 | Topol et al. |
| 4,581,687 | A | 4/1986 | Nakanishi |
| 4,597,033 | A | 6/1986 | Meggs et al. |
| 4,600,972 | A | 7/1986 | MacIntyre |
| 4,607,317 | A | 8/1986 | Lin |
| 4,622,881 | A | 11/1986 | Rand |
| 4,625,152 | A | 11/1986 | Nakai |
| 4,635,052 | A | 1/1987 | Aoike et al. |
| 4,647,217 | A | 3/1987 | Havel |
| 4,656,398 | A | 4/1987 | Michael et al. |
| 4,661,890 | A | 4/1987 | Watanabe et al. |
| 4,668,895 | A | 5/1987 | Schneiter |
| 4,669,033 | A | 5/1987 | Lee |
| 4,675,575 | A | 6/1987 | Smith et al. |
| 4,682,079 | A | 7/1987 | Sanders et al. |
| 4,686,425 | A | 8/1987 | Havel |
| 4,687,340 | A | 8/1987 | Havel |
| 4,688,154 | A | 8/1987 | Nilssen |
| 4,688,869 | A | 8/1987 | Kelly |
| 4,695,769 | A | 9/1987 | Schweickardt |
| 4,698,730 | A | 10/1987 | Sakai et al. |
| 4,701,669 | A | 10/1987 | Head et al. |
| 4,705,406 | A | 11/1987 | Havel |
| 4,707,141 | A | 11/1987 | Havel |
| D293,723 | S | 1/1988 | Buttner |
| 4,727,289 | A | 2/1988 | Uchida |
| 4,727,457 | A | 2/1988 | Thillays |
| 4,739,454 | A | 4/1988 | Federgreen |
| 4,740,882 | A | 4/1988 | Miller |
| 4,748,545 | A | 5/1988 | Schmitt |
| 4,753,148 | A | 6/1988 | Johnson |
| 4,758,173 | A | 7/1988 | Northrop |
| 4,765,708 | A | 8/1988 | Becker et al. |
| 4,767,172 | A | 8/1988 | Nichols et al. |
| 4,771,274 | A | 9/1988 | Havel |
| 4,780,621 | A | 10/1988 | Bartleucci et al. |
| 4,794,373 | A | 12/1988 | Harrison |
| 4,794,383 | A | 12/1988 | Havel |
| 4,801,928 | A | 1/1989 | Minter |
| 4,810,937 | A | 3/1989 | Havel |
| 4,818,072 | A | 4/1989 | Mohebban |
| 4,824,269 | A | 4/1989 | Havel |
| 4,837,565 | A | 6/1989 | White |
| 4,843,627 | A | 6/1989 | Stebbins |
| 4,845,481 | A | 7/1989 | Havel |
| 4,845,745 | A | 7/1989 | Havel |
| 4,851,972 | A | 7/1989 | Altman |
| 4,854,701 | A | 8/1989 | Noll et al. |
| 4,857,801 | A | 8/1989 | Farrell |
| 4,863,223 | A | 9/1989 | Weissenbach et al. |
| 4,870,325 | A | 9/1989 | Kazar |
| 4,874,320 | A | 10/1989 | Freed et al. |
| 4,887,074 | A | 12/1989 | Simon et al. |
| 4,894,832 | A | 1/1990 | Colak |
| 4,901,207 | A | 2/1990 | Sato et al. |
| 4,904,988 | A | 2/1990 | Nesbit et al. |
| 4,912,371 | A | 3/1990 | Hamilton |
| 4,922,154 | A | 5/1990 | Cacoub |
| 4,929,936 | A | 5/1990 | Friedman et al. |
| 4,934,852 | A | 6/1990 | Havel |
| 4,941,072 | A | 7/1990 | Yasumoto et al. |
| 4,943,900 | A | 7/1990 | Gartner |
| 4,962,687 | A | 10/1990 | Belliveau et al. |
| 4,965,561 | A | 10/1990 | Havel |
| 4,973,835 | A | 11/1990 | Kurosu et al. |
| 4,977,351 | A | 12/1990 | Bavaro et al. |
| 4,979,081 | A | 12/1990 | Leach et al. |
| 4,979,180 | A | 12/1990 | Muncheryan |
| 4,980,806 | A | 12/1990 | Taylor et al. |
| 4,991,070 | A | 2/1991 | Stob |
| 4,992,704 | A | 2/1991 | Stinson |
| 5,001,609 | A | 3/1991 | Gardner et al. |
| 5,003,227 | A | 3/1991 | Nilssen |
| 5,008,595 | A | 4/1991 | Kazar |
| 5,008,788 | A | 4/1991 | Palinkas |
| 5,010,459 | A | 4/1991 | Taylor et al. |
| 5,018,054 | A | 5/1991 | Ohashi et al. |
| 5,027,037 | A | 6/1991 | Wei |
| 5,027,262 | A | 6/1991 | Freed |
| 5,032,960 | A | 7/1991 | Katoh |
| 5,034,807 | A | 7/1991 | Von Kohorn |
| 5,036,248 | A | 7/1991 | McEwan et al. |
| 5,038,255 | A | 8/1991 | Nishihashi et al. |
| 5,065,226 | A | 11/1991 | Kluitmans et al. |
| 5,072,216 | A | 12/1991 | Grange |
| 5,078,039 | A | 1/1992 | Tulk et al. |
| 5,083,063 | A | 1/1992 | Brooks |
| 5,088,013 | A | 2/1992 | Revis |
| 5,089,748 | A | 2/1992 | Ihms |
| 5,103,382 | A | 4/1992 | Kondo et al. |
| 5,122,733 | A | 6/1992 | Havel |
| 5,126,634 | A | 6/1992 | Johnson |
| 5,128,595 | A | 7/1992 | Hara |
| 5,130,761 | A | 7/1992 | Tanaka |
| 5,130,909 | A | 7/1992 | Gross |
| 5,134,387 | A | 7/1992 | Smith et al. |
| 5,136,483 | A | 8/1992 | Schoniger et al. |

(56) References Cited

U.S. PATENT DOCUMENTS

| | | | |
|---|---|---|---|
| 5,140,220 | A | 8/1992 | Hasegawa |
| 5,142,199 | A | 8/1992 | Elwell |
| 5,151,679 | A | 9/1992 | Dimmick |
| 5,154,641 | A | 10/1992 | McLaughlin |
| 5,161,879 | A | 11/1992 | McDermott |
| 5,161,882 | A | 11/1992 | Garrett |
| 5,164,715 | A | 11/1992 | Kashiwabara et al. |
| 5,184,114 | A | 2/1993 | Brown |
| 5,194,854 | A | 3/1993 | Havel |
| 5,198,756 | A | 3/1993 | Jenkins et al. |
| 5,209,560 | A | 5/1993 | Taylor et al. |
| 5,220,250 | A | 6/1993 | Szuba |
| 5,225,765 | A | 7/1993 | Callahan et al. |
| 5,226,723 | A | 7/1993 | Chen |
| 5,254,910 | A | 10/1993 | Yang |
| 5,256,948 | A | 10/1993 | Boldin et al. |
| 5,268,828 | A | 12/1993 | Miura |
| 5,278,542 | A | 1/1994 | Smith et al. |
| 5,282,121 | A | 1/1994 | Bornhorst et al. |
| 5,283,517 | A | 2/1994 | Havel |
| 5,287,352 | A | 2/1994 | Jackson et al. |
| 5,294,865 | A | 3/1994 | Haraden |
| 5,298,871 | A | 3/1994 | Shimohara |
| 5,301,090 | A | 4/1994 | Hed |
| 5,303,124 | A | 4/1994 | Wrobel |
| 5,307,295 | A | 4/1994 | Taylor et al. |
| 5,321,593 | A | 6/1994 | Moates |
| 5,323,226 | A | 6/1994 | Schreder |
| 5,329,431 | A | 7/1994 | Taylor et al. |
| 5,344,068 | A | 9/1994 | Haessig |
| 5,350,977 | A | 9/1994 | Hamamoto et al. |
| 5,357,170 | A | 10/1994 | Luchaco et al. |
| 5,365,411 | A | 11/1994 | Rycroft et al. |
| 5,371,618 | A | 12/1994 | Tai et al. |
| 5,374,876 | A | 12/1994 | Horibata et al. |
| 5,375,043 | A | 12/1994 | Tokunaga |
| D354,360 | S | 1/1995 | Murata |
| 5,381,074 | A | 1/1995 | Rudzewicz et al. |
| 5,388,357 | A | 2/1995 | Malita |
| 5,402,702 | A | 4/1995 | Hata |
| 5,404,094 | A | 4/1995 | Green et al. |
| 5,404,282 | A | 4/1995 | Klinke et al. |
| 5,406,176 | A | 4/1995 | Sugden |
| 5,410,328 | A | 4/1995 | Yoksza et al. |
| 5,412,284 | A | 5/1995 | Moore et al. |
| 5,412,552 | A | 5/1995 | Fernandes |
| 5,420,482 | A | 5/1995 | Phares |
| 5,421,059 | A | 6/1995 | Leffers, Jr. |
| 5,430,356 | A | 7/1995 | Ference et al. |
| 5,432,408 | A | 7/1995 | Matsuda et al. |
| 5,436,535 | A | 7/1995 | Yang |
| 5,436,853 | A | 7/1995 | Shimohara |
| 5,450,301 | A | 9/1995 | Waltz et al. |
| 5,461,188 | A | 10/1995 | Drago et al. |
| 5,463,280 | A | 10/1995 | Johnson |
| 5,463,502 | A | 10/1995 | Savage, Jr. |
| 5,465,144 | A | 11/1995 | Parker et al. |
| 5,473,522 | A | 12/1995 | Kriz et al. |
| 5,475,300 | A | 12/1995 | Havel |
| 5,481,441 | A | 1/1996 | Stevens |
| 5,489,827 | A | 2/1996 | Xia |
| 5,491,402 | A | 2/1996 | Small |
| 5,493,183 | A | 2/1996 | Kimball |
| 5,504,395 | A | 4/1996 | Johnson et al. |
| 5,506,760 | A | 4/1996 | Giebler et al. |
| 5,513,082 | A | 4/1996 | Asano |
| 5,519,496 | A | 5/1996 | Borgert et al. |
| 5,530,322 | A | 6/1996 | Ference et al. |
| 5,544,809 | A | 8/1996 | Keating et al. |
| 5,545,950 | A | 8/1996 | Cho |
| 5,550,440 | A | 8/1996 | Allison et al. |
| 5,559,681 | A | 9/1996 | Duarte |
| 5,561,346 | A | 10/1996 | Byrne |
| D376,030 | S | 11/1996 | Cohen |
| 5,575,459 | A | 11/1996 | Anderson |
| 5,575,554 | A | 11/1996 | Guritz |
| 5,581,158 | A | 12/1996 | Quazi |
| 5,592,051 | A | 1/1997 | Korkala |
| 5,592,054 | A | 1/1997 | Nerone et al. |
| 5,600,199 | A | 2/1997 | Martin, Sr. et al. |
| 5,607,227 | A | 3/1997 | Yasumoto et al. |
| 5,608,290 | A | 3/1997 | Hutchisson et al. |
| 5,614,788 | A | 3/1997 | Mullins et al. |
| 5,621,282 | A | 4/1997 | Haskell |
| 5,621,603 | A | 4/1997 | Adamec et al. |
| 5,621,662 | A | 4/1997 | Humphries et al. |
| 5,622,423 | A | 4/1997 | Lee |
| 5,633,629 | A | 5/1997 | Hochstein |
| 5,634,711 | A | 6/1997 | Kennedy et al. |
| 5,639,158 | A | 6/1997 | Sato |
| 5,640,061 | A | 6/1997 | Bornhorst et al. |
| 5,640,141 | A | 6/1997 | Myllymaki |
| 5,640,792 | A | 6/1997 | O'Shea |
| 5,642,129 | A | 6/1997 | Zavracky et al. |
| 5,655,830 | A | 8/1997 | Ruskouski |
| 5,656,935 | A | 8/1997 | Havel |
| 5,661,374 | A | 8/1997 | Cassidy et al. |
| 5,661,645 | A | 8/1997 | Hochstein |
| 5,673,059 | A | 9/1997 | Zavracky et al. |
| 5,682,103 | A | 10/1997 | Burrell |
| 5,684,523 | A | 11/1997 | Satoh et al. |
| 5,688,042 | A | 11/1997 | Madadi et al. |
| 5,690,417 | A | 11/1997 | Lin et al. |
| 5,697,695 | A | 12/1997 | Lin et al. |
| 5,699,243 | A | 12/1997 | Eckel et al. |
| 5,701,058 | A | 12/1997 | Roth |
| 5,712,650 | A | 1/1998 | Barlow |
| 5,713,655 | A | 2/1998 | Blackman |
| 5,721,471 | A | 2/1998 | Begemann et al. |
| 5,725,148 | A | 3/1998 | Hartman |
| 5,726,535 | A | 3/1998 | Yan |
| 5,731,759 | A | 3/1998 | Finucan |
| 5,734,590 | A | 3/1998 | Tebbe |
| 5,751,118 | A | 5/1998 | Mortimer |
| 5,752,766 | A | 5/1998 | Bailey et al. |
| 5,765,940 | A | 6/1998 | Levy et al. |
| 5,769,527 | A | 6/1998 | Taylor et al. |
| 5,784,006 | A | 7/1998 | Hochstein |
| 5,785,227 | A | 7/1998 | Akiba |
| 5,790,329 | A | 8/1998 | Klaus et al. |
| 5,803,579 | A | 9/1998 | Turnbull et al. |
| 5,803,580 | A | 9/1998 | Tseng |
| 5,803,729 | A | 9/1998 | Tsimerman |
| 5,806,965 | A | 9/1998 | Deese |
| 5,808,689 | A | 9/1998 | Small |
| 5,810,463 | A | 9/1998 | Kawahara et al. |
| 5,812,105 | A | 9/1998 | Van de Ven |
| 5,813,751 | A | 9/1998 | Shaffer |
| 5,813,753 | A | 9/1998 | Vriens et al. |
| 5,821,695 | A | 10/1998 | Vilanilam et al. |
| 5,825,051 | A | 10/1998 | Bauer et al. |
| 5,828,178 | A | 10/1998 | York et al. |
| 5,831,522 | A | 11/1998 | Weed et al. |
| 5,836,676 | A | 11/1998 | Ando et al. |
| 5,848,837 | A | 12/1998 | Gustafson |
| 5,850,126 | A | 12/1998 | Kanbar |
| 5,851,063 | A | 12/1998 | Doughty et al. |
| 5,852,658 | A | 12/1998 | Knight et al. |
| 5,854,542 | A | 12/1998 | Forbes |
| RE36,030 | E | 1/1999 | Nadeau |
| 5,859,508 | A | 1/1999 | Ge et al. |
| 5,865,529 | A | 2/1999 | Yan |
| 5,870,233 | A | 2/1999 | Benz et al. |
| 5,890,794 | A | 4/1999 | Abtahi et al. |
| 5,893,633 | A | 4/1999 | Saito et al. |
| 5,896,010 | A | 4/1999 | Mikolajczak et al. |
| 5,904,415 | A | 5/1999 | Robertson et al. |
| 5,907,742 | A | 5/1999 | Johnson et al. |
| 5,909,378 | A | 6/1999 | De Milleville |
| 5,912,653 | A | 6/1999 | Fitch |
| 5,917,287 | A | 6/1999 | Haederle et al. |
| 5,917,534 | A | 6/1999 | Rajeswaran |
| 5,921,660 | A | 7/1999 | Yu |
| 5,924,784 | A | 7/1999 | Chliwnyj et al. |

(56) References Cited

U.S. PATENT DOCUMENTS

| | | | |
|---|---|---|---|
| 5,927,845 | A | 7/1999 | Gustafson et al. |
| 5,934,792 | A | 8/1999 | Camarota |
| 5,936,599 | A | 8/1999 | Reymond |
| 5,943,802 | A | 8/1999 | Tijanic |
| 5,946,209 | A | 8/1999 | Eckel et al. |
| 5,949,347 | A | 9/1999 | Wu |
| 5,951,145 | A | 9/1999 | Iwasaki et al. |
| 5,952,680 | A | 9/1999 | Strite |
| 5,959,547 | A | 9/1999 | Tubel et al. |
| 5,961,072 | A | 10/1999 | Bodle |
| 5,962,989 | A | 10/1999 | Baker |
| 5,962,992 | A | 10/1999 | Huang et al. |
| 5,963,185 | A | 10/1999 | Havel |
| 5,966,069 | A | 10/1999 | Zmurk et al. |
| 5,974,553 | A | 10/1999 | Gandar |
| 5,980,064 | A | 11/1999 | Metroyanis |
| 5,998,925 | A | 12/1999 | Shimizu et al. |
| 5,998,928 | A | 12/1999 | Hipp |
| 6,000,807 | A | 12/1999 | Moreland |
| 6,007,209 | A | 12/1999 | Pelka |
| 6,008,783 | A | 12/1999 | Kitagawa et al. |
| 6,010,228 | A | 1/2000 | Blackman et al. |
| 6,011,691 | A | 1/2000 | Schreffler |
| 6,016,038 | A | 1/2000 | Mueller et al. |
| 6,018,237 | A | 1/2000 | Havel |
| 6,019,493 | A | 2/2000 | Kuo et al. |
| 6,020,825 | A | 2/2000 | Chansky et al. |
| 6,025,550 | A | 2/2000 | Kato |
| 6,028,694 | A | 2/2000 | Schmidt |
| 6,030,099 | A | 2/2000 | McDermott |
| 6,031,343 | A | 2/2000 | Recknagel et al. |
| 6,031,958 | A | 2/2000 | McGaffigan |
| 6,036,335 | A | 3/2000 | Openiano |
| 6,036,336 | A | 3/2000 | Wu |
| D422,737 | S | 4/2000 | Orozco |
| 6,056,420 | A | 5/2000 | Wilson et al. |
| 6,068,383 | A | 5/2000 | Robertson et al. |
| 6,069,597 | A | 5/2000 | Hansen |
| 6,072,280 | A | 6/2000 | Allen |
| 6,074,074 | A | 6/2000 | Marcus |
| 6,084,359 | A | 7/2000 | Hetzel et al. |
| 6,086,220 | A | 7/2000 | Lash et al. |
| 6,091,200 | A | 7/2000 | Lenz |
| 6,092,915 | A | 7/2000 | Rensch |
| 6,095,661 | A | 8/2000 | Lebens et al. |
| 6,097,352 | A | 8/2000 | Zavracky et al. |
| 6,115,184 | A | 9/2000 | Hubble, III et al. |
| 6,116,748 | A | 9/2000 | George |
| 6,121,875 | A | 9/2000 | Hamm et al. |
| 6,127,783 | A | 10/2000 | Pashley et al. |
| 6,132,072 | A | 10/2000 | Turnbull et al. |
| 6,135,604 | A | 10/2000 | Lin |
| 6,135,620 | A | 10/2000 | Marsh |
| 6,139,174 | A | 10/2000 | Butterworth |
| 6,149,283 | A | 11/2000 | Conway et al. |
| 6,150,774 | A | 11/2000 | Mueller et al. |
| 6,151,529 | A | 11/2000 | Batko |
| 6,153,985 | A | 11/2000 | Grossman |
| 6,158,882 | A | 12/2000 | Bischoff, Jr. |
| 6,166,496 | A | 12/2000 | Lys et al. |
| 6,175,201 | B1 | 1/2001 | Sid |
| 6,175,220 | B1 | 1/2001 | Billig et al. |
| 6,181,126 | B1 | 1/2001 | Havel |
| D437,947 | S | 2/2001 | Huang |
| 6,183,086 | B1 | 2/2001 | Neubert |
| 6,183,104 | B1 | 2/2001 | Ferrara |
| 6,184,628 | B1 | 2/2001 | Ruthenberg |
| 6,196,471 | B1 | 3/2001 | Ruthenberg |
| 6,203,180 | B1 | 3/2001 | Fleischmann |
| 6,211,626 | B1 | 4/2001 | Lys et al. |
| 6,215,409 | B1 | 4/2001 | Blach |
| 6,217,190 | B1 | 4/2001 | Altman et al. |
| 6,219,239 | B1 | 4/2001 | Mellberg et al. |
| 6,227,679 | B1 | 5/2001 | Zhang et al. |
| 6,234,645 | B1 | 5/2001 | Börner et al. |
| 6,238,075 | B1 | 5/2001 | Dealey, Jr. et al. |
| 6,240,665 | B1 | 6/2001 | Brown et al. |
| 6,241,359 | B1 | 6/2001 | Lin |
| 6,249,221 | B1 | 6/2001 | Reed |
| 6,250,774 | B1 | 6/2001 | Begemann et al. |
| 6,252,350 | B1 | 6/2001 | Alvarez |
| 6,252,358 | B1 | 6/2001 | Xydis et al. |
| 6,268,600 | B1 | 7/2001 | Nakamura et al. |
| 6,273,338 | B1 | 8/2001 | White |
| 6,275,397 | B1 | 8/2001 | McClain |
| 6,283,612 | B1 | 9/2001 | Hunter |
| 6,292,901 | B1 | 9/2001 | Lys et al. |
| 6,293,684 | B1 | 9/2001 | Riblett |
| 6,297,724 | B1 | 10/2001 | Bryans et al. |
| 6,305,109 | B1 | 10/2001 | Lee |
| 6,305,821 | B1 | 10/2001 | Hsieh et al. |
| 6,307,331 | B1 | 10/2001 | Bonasia et al. |
| 6,310,590 | B1 | 10/2001 | Havel |
| 6,315,429 | B1 | 11/2001 | Grandolfo |
| 6,323,832 | B1 | 11/2001 | Nishizawa et al. |
| 6,325,651 | B1 | 12/2001 | Nishihara et al. |
| 6,334,699 | B1 | 1/2002 | Gladnick |
| 6,340,868 | B1 | 1/2002 | Lys et al. |
| 6,354,714 | B1 | 3/2002 | Rhodes |
| 6,361,186 | B1 | 3/2002 | Slayden |
| 6,362,578 | B1 | 3/2002 | Swanson et al. |
| 6,369,525 | B1 | 4/2002 | Chang et al. |
| 6,371,637 | B1 | 4/2002 | Atchinson et al. |
| 6,373,733 | B1 | 4/2002 | Wu et al. |
| 6,379,022 | B1 | 4/2002 | Amerson et al. |
| 6,380,865 | B1 | 4/2002 | Pederson |
| D457,667 | S | 5/2002 | Piepgras et al. |
| D457,669 | S | 5/2002 | Piepgras et al. |
| D457,974 | S | 5/2002 | Piepgras et al. |
| 6,388,393 | B1 | 5/2002 | Illingworth |
| 6,394,623 | B1 | 5/2002 | Tsui |
| 6,396,216 | B1 | 5/2002 | Noone et al. |
| D458,395 | S | 6/2002 | Piepgras et al. |
| 6,400,096 | B1 | 6/2002 | Wells et al. |
| 6,404,131 | B1 | 6/2002 | Kawano et al. |
| 6,411,022 | B1 | 6/2002 | Machida |
| 6,411,045 | B1 | 6/2002 | Nerone |
| 6,422,716 | B2 | 7/2002 | Henrici et al. |
| 6,428,189 | B1 | 8/2002 | Hochstein |
| 6,429,604 | B1 | 8/2002 | Chang |
| D463,610 | S | 9/2002 | Piepgras et al. |
| 6,445,139 | B1 | 9/2002 | Marshall et al. |
| 6,448,550 | B1 | 9/2002 | Nishimura |
| 6,448,716 | B1 | 9/2002 | Hutchison |
| 6,459,919 | B1 | 10/2002 | Lys et al. |
| 6,464,373 | B1 | 10/2002 | Petrick |
| 6,469,457 | B2 | 10/2002 | Callahan |
| 6,471,388 | B1 | 10/2002 | Marsh |
| 6,472,823 | B2 | 10/2002 | Yen |
| 6,473,002 | B1 | 10/2002 | Hutchison |
| D468,035 | S | 12/2002 | Blanc et al. |
| 6,488,392 | B1 | 12/2002 | Lu |
| 6,495,964 | B1 | 12/2002 | Muthu et al. |
| 6,511,204 | B2 | 1/2003 | Emmel et al. |
| 6,517,218 | B2 | 2/2003 | Hochstein |
| 6,521,879 | B1 | 2/2003 | Rand et al. |
| 6,527,411 | B1 | 3/2003 | Sayers |
| 6,528,954 | B1 | 3/2003 | Lys et al. |
| 6,528,958 | B2 | 3/2003 | Hulshof et al. |
| 6,538,375 | B1 | 3/2003 | Duggal et al. |
| 6,540,381 | B1 | 4/2003 | Douglass, II |
| 6,541,800 | B2 | 4/2003 | Barnett et al. |
| 6,548,967 | B1 | 4/2003 | Dowling et al. |
| 6,568,834 | B1 | 5/2003 | Scianna |
| 6,573,536 | B1 | 6/2003 | Dry |
| 6,577,072 | B2 | 6/2003 | Saito et al. |
| 6,577,080 | B2 | 6/2003 | Lys et al. |
| 6,577,512 | B2 | 6/2003 | Tripathi et al. |
| 6,577,794 | B1 | 6/2003 | Currie et al. |
| 6,578,979 | B2 | 6/2003 | Truttmann-Battig |
| 6,582,103 | B1 | 6/2003 | Popovich et al. |
| 6,583,550 | B2 | 6/2003 | Iwasa et al. |
| 6,583,573 | B2 | 6/2003 | Bierman |
| D477,093 | S | 7/2003 | Moriyama et al. |

(56) References Cited

U.S. PATENT DOCUMENTS 6,585,393 B1 7/2003 Brandes et al.
6,586,890 B2 7/2003 Min et al.
6,590,343 B2 7/2003 Pederson
6,592,238 B2 7/2003 Cleaver et al.
6,594,369 B1 7/2003 Une
6,596,977 B2 7/2003 Muthu et al.
6,598,996 B1 7/2003 Lodhie
6,608,453 B2 8/2003 Morgan et al.
6,608,614 B1 8/2003 Johnson
6,609,804 B2 8/2003 Nolan et al.
6,609,813 B1 8/2003 Showers et al.
6,612,712 B2 9/2003 Nepil
6,612,717 B2 9/2003 Yen
6,612,729 B1 9/2003 Hoffman
6,621,222 B1 9/2003 Hong
6,623,151 B2 9/2003 Pederson
6,624,597 B2 9/2003 Dowling et al.
D481,484 S 10/2003 Cuevas et al.
6,634,770 B2 10/2003 Cao
6,634,779 B2 10/2003 Reed
6,636,003 B2 10/2003 Rahm et al.
6,639,349 B1 10/2003 Bahadur
6,641,284 B2 11/2003 Stopa et al.
6,652,117 B2 11/2003 Tsai
6,659,622 B2 12/2003 Katogi et al.
6,660,935 B2 12/2003 Southard et al.
6,666,689 B1 12/2003 Savage, Jr.
6,667,623 B2 12/2003 Bourgault et al.
6,674,096 B2 1/2004 Sommers
6,676,284 B1 1/2004 Wynne Willson
6,679,621 B2 1/2004 West et al.
6,681,154 B2 1/2004 Nierlich et al.
6,682,205 B2 1/2004 Lin
6,683,419 B2 1/2004 Kriparos
6,700,136 B2 3/2004 Guida
6,712,486 B1 3/2004 Popovich et al.
6,717,376 B2 4/2004 Lys et al.
6,717,526 B2 4/2004 Martineau et al.
6,720,745 B2 4/2004 Lys et al.
6,726,348 B2 4/2004 Gloisten
6,736,525 B2 5/2004 Chin
6,741,324 B1 5/2004 Kim
D491,678 S 6/2004 Piepgras
D492,042 S 6/2004 Piepgras
6,744,223 B2 6/2004 Laflamme et al.
6,748,299 B1 6/2004 Motoyama
6,762,562 B2 7/2004 Leong
6,768,047 B2 7/2004 Chang et al.
6,774,584 B2 8/2004 Lys et al.
6,777,891 B2 8/2004 Lys et al.
6,781,329 B2 8/2004 Mueller et al.
6,787,999 B2 9/2004 Stimac et al.
6,788,000 B2 9/2004 Appelberg et al.
6,788,011 B2 9/2004 Mueller et al.
6,791,840 B2 9/2004 Chun
6,796,680 B1 9/2004 Showers et al.
6,799,864 B2 10/2004 Bohler et al.
6,801,003 B2 10/2004 Schanberger et al.
6,803,732 B2 10/2004 Kraus et al.
6,806,659 B1 10/2004 Mueller et al.
6,814,470 B2 11/2004 Rizkin et al.
6,814,478 B2 11/2004 Menke
6,815,724 B2 11/2004 Dry
6,846,094 B2 1/2005 Luk
6,851,816 B2 2/2005 Wu et al.
6,851,832 B2 2/2005 Tieszen
6,853,150 B2 2/2005 Clauberg et al.
6,853,151 B2 2/2005 Leong et al.
6,853,563 B1 2/2005 Yang et al.
6,857,924 B2 2/2005 Fu et al.
6,860,628 B2 3/2005 Robertson et al.
6,866,401 B2 3/2005 Sommers et al.
6,869,204 B2 3/2005 Morgan et al.
6,871,981 B2 3/2005 Alexanderson et al.
6,874,924 B1 4/2005 Hulse et al.
6,879,883 B1 4/2005 Motoyama
6,882,111 B2 4/2005 Kan et al.
6,883,929 B2 4/2005 Dowling
6,883,934 B2 4/2005 Kawakami et al.
6,888,322 B2 5/2005 Dowling et al.
6,897,624 B2 5/2005 Lys et al.
D506,274 S 6/2005 Moriyama et al.
6,909,239 B2 6/2005 Gauna
6,909,921 B1 6/2005 Bilger
6,918,680 B2 7/2005 Seeberger
6,921,181 B2 7/2005 Yen
6,926,419 B2 8/2005 An
6,936,968 B2 8/2005 Cross et al.
6,936,978 B2 8/2005 Morgan et al.
6,940,230 B2 9/2005 Myron et al.
6,948,829 B2 9/2005 Verdes et al.
6,953,261 B1 10/2005 Jiao et al.
6,957,905 B1 10/2005 Pritchard et al.
6,963,175 B2 11/2005 Archenhold et al.
6,964,501 B2 11/2005 Ryan
6,965,197 B2 11/2005 Tyan et al.
6,965,205 B2 11/2005 Piepgras et al.
6,967,448 B2 11/2005 Morgan et al.
6,969,179 B2 11/2005 Sloan et al.
6,969,186 B2 11/2005 Sonderegger et al.
6,969,954 B2 11/2005 Lys
6,975,079 B2 12/2005 Lys et al.
6,979,097 B2 12/2005 Elam et al.
6,982,518 B2 1/2006 Chou et al.
6,995,681 B2 2/2006 Pederson
6,997,576 B1 2/2006 Lodhie et al.
6,999,318 B2 2/2006 Newby
7,004,603 B2 2/2006 Knight
D518,218 S 3/2006 Roberge et al.
7,008,079 B2 3/2006 Smith
7,014,336 B1 3/2006 Ducharme et al.
7,015,650 B2 3/2006 McGrath
7,018,063 B2 3/2006 Michael et al.
7,018,074 B2 3/2006 Raby et al.
7,021,799 B2 4/2006 Mizuyoshi
7,021,809 B2 4/2006 Iwasa et al.
7,024,256 B2 4/2006 Krzyzanowski et al.
7,029,145 B2 4/2006 Frederick
7,031,920 B2 4/2006 Dowling et al.
7,033,036 B2 4/2006 Pederson
7,038,398 B1 5/2006 Lys et al.
7,038,399 B2 5/2006 Lys et al.
7,042,172 B2 5/2006 Dowling et al.
7,048,423 B2 5/2006 Stepanenko et al.
7,049,761 B2 5/2006 Timmermans et al.
7,052,171 B1 5/2006 Lefebvre et al.
7,053,557 B2 5/2006 Cross et al.
7,064,498 B2 6/2006 Dowling et al.
7,064,674 B2 6/2006 Pederson
7,067,992 B2 6/2006 Leong et al.
7,077,978 B2 7/2006 Setlur et al.
7,080,927 B2 7/2006 Feuerborn et al.
7,086,747 B2 8/2006 Nielson et al.
7,088,014 B2 8/2006 Nierlich et al.
7,088,904 B2 8/2006 Ryan, Jr.
7,102,902 B1 9/2006 Brown et al.
7,113,541 B1 9/2006 Lys et al.
7,114,830 B2 10/2006 Robertson et al.
7,114,834 B2 10/2006 Rivas et al.
7,118,262 B2 10/2006 Negley
7,119,503 B2 10/2006 Kemper
7,120,560 B2 10/2006 Williams et al.
7,121,679 B2 10/2006 Fujimoto
7,122,976 B1 10/2006 Null et al.
7,128,442 B2 10/2006 Lee et al.
7,128,454 B2 10/2006 Kim et al.
D532,532 S 11/2006 Maxik
7,132,635 B2 11/2006 Dowling
7,132,785 B2 11/2006 Ducharme
7,132,804 B2 11/2006 Lys et al.
7,135,824 B2 11/2006 Lys et al.
7,139,617 B1 11/2006 Morgan et al.
7,144,135 B2 12/2006 Martin et al.
7,153,002 B2 12/2006 Kim et al.

(56) References Cited

U.S. PATENT DOCUMENTS

| | | | |
|---|---|---|---|
| 7,161,311 | B2 | 1/2007 | Mueller et al. |
| 7,161,313 | B2 | 1/2007 | Piepgras et al. |
| 7,161,556 | B2 | 1/2007 | Morgan et al. |
| 7,164,110 | B2 | 1/2007 | Pitigoi-Aron et al. |
| 7,164,235 | B2 | 1/2007 | Ito et al. |
| 7,165,863 | B1 | 1/2007 | Thomas et al. |
| 7,165,866 | B2 | 1/2007 | Li |
| 7,167,777 | B2 | 1/2007 | Budike, Jr. |
| 7,168,843 | B2 | 1/2007 | Striebel |
| D536,468 | S | 2/2007 | Crosby |
| 7,178,941 | B2 | 2/2007 | Roberge et al. |
| 7,180,252 | B2 | 2/2007 | Lys et al. |
| D538,950 | S | 3/2007 | Maxik |
| D538,952 | S | 3/2007 | Maxik et al. |
| D538,962 | S | 3/2007 | Elliott |
| 7,186,003 | B2 | 3/2007 | Dowling et al. |
| 7,186,005 | B2 | 3/2007 | Hulse |
| 7,187,141 | B2 | 3/2007 | Mueller et al. |
| 7,190,126 | B1 | 3/2007 | Paton |
| 7,192,154 | B2 | 3/2007 | Becker |
| 7,198,387 | B1 | 4/2007 | Gloisten et al. |
| 7,201,491 | B2 | 4/2007 | Bayat et al. |
| 7,201,497 | B2 | 4/2007 | Weaver, Jr. et al. |
| 7,202,613 | B2 | 4/2007 | Morgan et al. |
| 7,204,615 | B2 | 4/2007 | Arik et al. |
| 7,204,622 | B2 | 4/2007 | Dowling et al. |
| 7,207,696 | B1 | 4/2007 | Lin |
| 7,210,818 | B2 | 5/2007 | Luk et al. |
| 7,210,957 | B2 | 5/2007 | Mrakovich |
| 7,211,959 | B1 | 5/2007 | Chou |
| 7,213,934 | B2 | 5/2007 | Zarian et al. |
| 7,217,004 | B2 | 5/2007 | Park et al. |
| 7,217,012 | B2 | 5/2007 | Southard et al. |
| 7,217,022 | B2 | 5/2007 | Ruffin |
| 7,218,056 | B1 | 5/2007 | Harwood |
| 7,218,238 | B2 | 5/2007 | Right et al. |
| 7,220,015 | B2 | 5/2007 | Dowling |
| 7,220,018 | B2 | 5/2007 | Crabb et al. |
| 7,221,104 | B2 | 5/2007 | Lys et al. |
| 7,221,110 | B2 | 5/2007 | Sears et al. |
| 7,224,000 | B2 | 5/2007 | Aanegola et al. |
| 7,226,189 | B2 | 6/2007 | Lee et al. |
| 7,228,052 | B1 | 6/2007 | Lin |
| 7,228,190 | B2 | 6/2007 | Dowling et al. |
| 7,231,060 | B2 | 6/2007 | Dowling et al. |
| 7,233,115 | B2 | 6/2007 | Lys |
| 7,233,831 | B2 | 6/2007 | Blackwell |
| 7,236,366 | B2 | 6/2007 | Chen |
| 7,237,924 | B2 | 7/2007 | Martineau et al. |
| 7,237,925 | B2 | 7/2007 | Mayer et al. |
| 7,239,532 | B1 | 7/2007 | Hsu et al. |
| 7,241,038 | B2 | 7/2007 | Naniwa et al. |
| 7,242,152 | B2 | 7/2007 | Dowling et al. |
| 7,246,926 | B2 | 7/2007 | Harwood |
| 7,246,931 | B2 | 7/2007 | Hsieh et al. |
| 7,248,239 | B2 | 7/2007 | Dowling et al. |
| 7,249,269 | B1 | 7/2007 | Motoyama |
| 7,249,865 | B2 | 7/2007 | Robertson |
| D548,868 | S | 8/2007 | Roberge et al. |
| 7,252,408 | B2 | 8/2007 | Mazzochette et al. |
| 7,253,566 | B2 | 8/2007 | Lys et al. |
| 7,255,457 | B2 | 8/2007 | Ducharme et al. |
| 7,255,460 | B2 | 8/2007 | Lee |
| 7,256,554 | B2 | 8/2007 | Lys |
| 7,258,458 | B2 | 8/2007 | Mochiachvili et al. |
| 7,258,467 | B2 | 8/2007 | Saccomanno et al. |
| 7,259,528 | B2 | 8/2007 | Pilz |
| 7,262,439 | B2 | 8/2007 | Setlur et al. |
| 7,262,559 | B2 | 8/2007 | Tripathi et al. |
| D550,379 | S | 9/2007 | Hoshikawa et al. |
| 7,264,372 | B2 | 9/2007 | Maglica |
| 7,267,467 | B2 | 9/2007 | Wu et al. |
| 7,270,443 | B2 | 9/2007 | Kurtz et al. |
| 7,271,794 | B1 | 9/2007 | Cheng et al. |
| 7,273,300 | B2 | 9/2007 | Mrakovich |
| 7,274,045 | B2 | 9/2007 | Chandran et al. |
| 7,274,160 | B2 | 9/2007 | Mueller et al. |
| 7,274,183 | B1 | 9/2007 | Gu et al. |
| D553,267 | S | 10/2007 | Yuen |
| 7,285,801 | B2 | 10/2007 | Eliashevich et al. |
| 7,288,902 | B1 | 10/2007 | Melanson |
| 7,288,904 | B2 | 10/2007 | Numeroli et al. |
| 7,296,912 | B2 | 11/2007 | Beauchamp |
| 7,300,184 | B2 | 11/2007 | Ichikawa et al. |
| 7,300,192 | B2 | 11/2007 | Mueller et al. |
| D556,937 | S | 12/2007 | Ly |
| D557,854 | S | 12/2007 | Lewis |
| 7,303,300 | B2 | 12/2007 | Dowling et al. |
| 7,306,353 | B2 | 12/2007 | Popovich et al. |
| 7,307,391 | B2 | 12/2007 | Shan |
| 7,308,296 | B2 | 12/2007 | Lys et al. |
| 7,309,965 | B2 | 12/2007 | Dowling et al. |
| 7,318,658 | B2 | 1/2008 | Wang et al. |
| 7,319,244 | B2 | 1/2008 | Liu et al. |
| 7,319,246 | B2 | 1/2008 | Soules et al. |
| 7,321,191 | B2 | 1/2008 | Setlur et al. |
| 7,326,964 | B2 | 2/2008 | Lim et al. |
| 7,327,281 | B2 | 2/2008 | Hutchison |
| 7,329,024 | B2 | 2/2008 | Lynch et al. |
| 7,329,031 | B2 | 2/2008 | Liaw et al. |
| D563,589 | S | 3/2008 | Hariri et al. |
| 7,344,278 | B2 | 3/2008 | Paravantsos |
| 7,345,320 | B2 | 3/2008 | Dahm |
| 7,348,604 | B2 | 3/2008 | Matheson |
| 7,350,936 | B2 | 4/2008 | Ducharme et al. |
| 7,350,952 | B2 | 4/2008 | Nishigaki |
| 7,352,138 | B2 | 4/2008 | Lys et al. |
| 7,352,339 | B2 | 4/2008 | Morgan et al. |
| 7,353,071 | B2 | 4/2008 | Blackwell et al. |
| 7,358,679 | B2 | 4/2008 | Lys et al. |
| 7,358,929 | B2 | 4/2008 | Mueller et al. |
| 7,370,986 | B2 | 5/2008 | Chan |
| 7,374,327 | B2 | 5/2008 | Schexnaider |
| 7,378,805 | B2 | 5/2008 | Oh et al. |
| 7,378,976 | B1 | 5/2008 | Paterno |
| 7,385,359 | B2 | 6/2008 | Dowling et al. |
| 7,391,159 | B2 | 6/2008 | Harwood |
| D574,093 | S | 7/2008 | Kitagawa et al. |
| 7,396,142 | B2 | 7/2008 | Laizure, Jr. et al. |
| 7,396,146 | B2 | 7/2008 | Wang |
| 7,401,935 | B2 | 7/2008 | VanderSchuit |
| 7,401,945 | B2 | 7/2008 | Zhang |
| D576,749 | S | 9/2008 | Kitagawa et al. |
| 7,423,548 | B2 | 9/2008 | Kontovich |
| 7,427,840 | B2 | 9/2008 | Morgan et al. |
| 7,429,117 | B2 | 9/2008 | Pohlert et al. |
| 7,434,964 | B1 | 10/2008 | Zheng et al. |
| 7,438,441 | B2 | 10/2008 | Sun et al. |
| D580,089 | S | 11/2008 | Ly et al. |
| D581,556 | S | 11/2008 | To et al. |
| 7,449,847 | B2 | 11/2008 | Schanberger et al. |
| D582,577 | S | 12/2008 | Yuen |
| 7,466,082 | B1 | 12/2008 | Snyder et al. |
| 7,470,046 | B2 | 12/2008 | Kao et al. |
| D584,428 | S | 1/2009 | Li et al. |
| D584,429 | S | 1/2009 | Pei et al. |
| 7,476,002 | B2 | 1/2009 | Wolf et al. |
| 7,476,004 | B2 | 1/2009 | Chan |
| 7,478,924 | B2 | 1/2009 | Robertson |
| 7,482,764 | B2 | 1/2009 | Morgan et al. |
| D586,484 | S | 2/2009 | Liu et al. |
| D586,928 | S | 2/2009 | Liu et al. |
| 7,490,957 | B2 | 2/2009 | Leong et al. |
| 7,497,596 | B2 | 3/2009 | Ge |
| 7,498,753 | B2 | 3/2009 | McAvoy et al. |
| 7,507,001 | B2 | 3/2009 | Kit |
| 7,510,299 | B2 | 3/2009 | Timmermans et al. |
| 7,510,400 | B2 | 3/2009 | Glovatsky et al. |
| 7,514,876 | B2 | 4/2009 | Roach, Jr. |
| 7,520,635 | B2 | 4/2009 | Wolf et al. |
| 7,521,872 | B2 | 4/2009 | Bruning |
| 7,524,089 | B2 | 4/2009 | Park |
| D592,766 | S | 5/2009 | Zhu et al. |
| D593,223 | S | 5/2009 | Komar |

(56) References Cited

U.S. PATENT DOCUMENTS 7,530,701 B2 5/2009 Chan-Wing
7,534,002 B2 5/2009 Yamaguchi et al.
D594,999 S 6/2009 Uchida et al.
7,549,769 B2 6/2009 Kim et al.
7,556,396 B2 7/2009 Kuo et al.
7,559,663 B2 7/2009 Wong et al.
7,562,998 B1 7/2009 Yen
D597,686 S 8/2009 Noh
7,569,981 B1 8/2009 Ciancanelli
7,572,030 B2 8/2009 Booth et al.
7,575,339 B2 8/2009 Hung
7,579,786 B2 8/2009 Soos
7,583,035 B2 9/2009 Shteynberg et al.
7,583,901 B2 9/2009 Nakagawa et al.
7,594,738 B1 9/2009 Lin et al.
D601,726 S 10/2009 Mollaert et al.
7,598,681 B2 10/2009 Lys et al.
7,598,684 B2 10/2009 Lys et al.
7,598,686 B2 10/2009 Lys et al.
7,600,907 B2 10/2009 Liu et al.
7,602,559 B2 10/2009 Jang et al.
7,618,157 B1 11/2009 Galvez et al.
7,619,366 B2 11/2009 Diederiks
7,635,201 B2 12/2009 Deng
7,635,214 B2 12/2009 Perlo
7,639,517 B2 12/2009 Zhou et al.
7,648,251 B2 1/2010 Whitehouse et al.
7,649,327 B2 1/2010 Peng
D610,724 S 2/2010 Chiang et al.
7,661,839 B2 2/2010 Tsai
D612,528 S 3/2010 McGrath et al.
7,690,813 B2 4/2010 Kanamori et al.
7,710,047 B2 5/2010 Shteynberg et al.
7,710,253 B1 5/2010 Fredricks
7,712,918 B2 5/2010 Siemiet et al.
7,748,886 B2 7/2010 Pazula et al.
7,758,207 B1 7/2010 Zhou et al.
7,759,881 B1 7/2010 Melanson
D621,975 S 8/2010 Wang
7,784,966 B2 8/2010 Verfuerth et al.
7,800,511 B1 9/2010 Hutchison et al.
7,815,338 B2 10/2010 Siemiet et al.
7,815,341 B2 10/2010 Steedly et al.
7,828,471 B2 11/2010 Lin
7,843,150 B2 11/2010 Wang et al.
7,848,702 B2 12/2010 Ho et al.
7,850,341 B2 12/2010 Mrakovich et al.
RE42,161 E 2/2011 Hochstein
7,878,683 B2 2/2011 Logan et al.
7,887,216 B2 2/2011 Patrick
7,887,226 B2 2/2011 Huang et al.
7,889,051 B1 2/2011 Billig et al.
D634,452 S 3/2011 de Visser
7,926,975 B2 4/2011 Siemiet et al.
7,938,562 B2 5/2011 Ivey et al.
7,946,729 B2 5/2011 Ivey et al.
7,952,292 B2 5/2011 Vegter et al.
7,976,196 B2 7/2011 Ivey et al.
7,990,070 B2 8/2011 Nerone
7,997,770 B1 8/2011 Meurer
8,013,472 B2 9/2011 Adest et al.
D650,097 S 12/2011 Trumble et al.
D650,494 S 12/2011 Tsao et al.
D652,968 S 1/2012 Aguiar et al.
8,093,823 B1 1/2012 Ivey et al.
D654,192 S 2/2012 Maxik et al.
8,118,447 B2 2/2012 Simon et al.
8,147,091 B2 4/2012 Hsia et al.
8,159,152 B1 4/2012 Salessi
D660,472 S 5/2012 Aguiar et al.
8,167,452 B2 5/2012 Chou
8,177,388 B2 5/2012 Yen
8,179,037 B2 5/2012 Chan et al.
8,183,989 B2 5/2012 Tsai
D662,236 S 6/2012 Matsushita
8,203,445 B2 6/2012 Recker et al.
8,214,084 B2 7/2012 Ivey et al.
8,247,985 B2 8/2012 Timmermans et al.
8,251,544 B2 8/2012 Ivey et al.
8,262,249 B2 9/2012 Hsia et al.
8,272,764 B2 9/2012 Son
8,287,144 B2 10/2012 Pedersen et al.
8,297,788 B2 10/2012 Bishop
8,299,722 B2 10/2012 Melanson
8,304,993 B2 11/2012 Tzou et al.
8,313,213 B2 11/2012 Lin et al.
8,319,407 B2 11/2012 Ke
8,319,433 B2 11/2012 Lin et al.
8,319,437 B2 11/2012 Carlin et al.
8,322,878 B2 12/2012 Hsia et al.
8,324,817 B2 12/2012 Ivey et al.
8,337,071 B2 12/2012 Negley et al.
8,376,579 B2 2/2013 Chang
8,376,588 B2 2/2013 Yen
8,382,322 B2 2/2013 Bishop
8,382,327 B2 2/2013 Timmermans et al.
8,382,502 B2 2/2013 Cao et al.
8,388,179 B2 3/2013 Hood et al.
8,398,275 B2 3/2013 Wang et al.
8,403,692 B2 3/2013 Cao et al.
8,405,314 B2 3/2013 Jensen
8,434,914 B2 5/2013 Li et al.
8,454,193 B2 6/2013 Simon et al.
8,482,212 B1 7/2013 Ivey et al.
8,571,716 B2 10/2013 Ivey et al.
2001/0033488 A1 10/2001 Chliwnyj et al.
2001/0045803 A1 11/2001 Cencur
2002/0011801 A1 1/2002 Chang
2002/0015297 A1 2/2002 Hayashi et al.
2002/0038157 A1 3/2002 Dowling et al.
2002/0041159 A1 4/2002 Kaping
2002/0044066 A1 4/2002 Dowling et al.
2002/0047516 A1 4/2002 Iwasa et al.
2002/0047569 A1 4/2002 Dowling et al.
2002/0047624 A1 4/2002 Stam et al.
2002/0047628 A1 4/2002 Morgan et al.
2002/0048169 A1 4/2002 Dowling et al.
2002/0057061 A1 5/2002 Mueller et al.
2002/0060526 A1 5/2002 Timmermans et al.
2002/0070688 A1 6/2002 Dowling et al.
2002/0074559 A1 6/2002 Dowling et al.
2002/0074958 A1 6/2002 Crenshaw
2002/0078221 A1 6/2002 Blackwell et al.
2002/0101197 A1 8/2002 Lys et al.
2002/0113555 A1 8/2002 Lys et al.
2002/0130627 A1 9/2002 Morgan et al.
2002/0145394 A1 10/2002 Morgan et al.
2002/0145869 A1 10/2002 Dowling
2002/0152045 A1 10/2002 Dowling et al.
2002/0152298 A1 10/2002 Kikta et al.
2002/0153851 A1 10/2002 Morgan et al.
2002/0158583 A1 10/2002 Lys et al.
2002/0163316 A1 11/2002 Lys et al.
2002/0171365 A1 11/2002 Morgan et al.
2002/0171377 A1 11/2002 Mueller et al.
2002/0171378 A1 11/2002 Morgan et al.
2002/0176259 A1 11/2002 Ducharme
2002/0179816 A1 12/2002 Haines et al.
2002/0195975 A1 12/2002 Schanberger et al.
2003/0011538 A1 1/2003 Lys et al.
2003/0021117 A1 1/2003 Chan
2003/0028260 A1 2/2003 Blackwell
2003/0031015 A1 2/2003 Ishibashi
2003/0048641 A1 3/2003 Alexanderson et al.
2003/0052599 A1 3/2003 Sun
2003/0057884 A1 3/2003 Dowling et al.
2003/0057886 A1 3/2003 Lys et al.
2003/0057887 A1 3/2003 Dowling et al.
2003/0057890 A1 3/2003 Lys et al.
2003/0076281 A1 4/2003 Morgan et al.
2003/0085710 A1 5/2003 Bourgault et al.
2003/0095404 A1 5/2003 Becks et al.
2003/0100837 A1 5/2003 Lys et al.
2003/0102810 A1 6/2003 Cross et al.

(56) References Cited

U.S. PATENT DOCUMENTS

2003/0133292 A1 7/2003 Mueller et al.
2003/0137258 A1 7/2003 Piepgras et al.
2003/0185005 A1 10/2003 Sommers et al.
2003/0185014 A1 10/2003 Gloisten
2003/0189412 A1 10/2003 Cunningham
2003/0218879 A1 11/2003 Tieszen
2003/0222587 A1 12/2003 Dowling, Jr. et al.
2003/0234342 A1 12/2003 Gaines et al.
2004/0003545 A1 1/2004 Gillespie
2004/0007980 A1 1/2004 Shibata
2004/0012959 A1 1/2004 Robertson et al.
2004/0036006 A1 2/2004 Dowling
2004/0037088 A1 2/2004 English et al.
2004/0052076 A1 3/2004 Mueller et al.
2004/0062041 A1 4/2004 Cross et al.
2004/0075572 A1 4/2004 Buschmann et al.
2004/0080960 A1 4/2004 Wu
2004/0090191 A1 5/2004 Mueller et al.
2004/0090787 A1 5/2004 Dowling et al.
2004/0105261 A1 6/2004 Ducharme et al.
2004/0105264 A1 6/2004 Spero
2004/0113568 A1 6/2004 Dowling et al.
2004/0114371 A1 6/2004 Lea et al.
2004/0116039 A1 6/2004 Mueller et al.
2004/0124782 A1 7/2004 Yu
2004/0130908 A1 7/2004 McClurg et al.
2004/0130909 A1 7/2004 Mueller et al.
2004/0141321 A1 7/2004 Dowling et al.
2004/0145886 A1 7/2004 Fatemi et al.
2004/0155609 A1 8/2004 Lys et al.
2004/0160199 A1 8/2004 Morgan et al.
2004/0178751 A1 9/2004 Mueller et al.
2004/0189262 A1 9/2004 McGrath
2004/0212320 A1 10/2004 Dowling et al.
2004/0212321 A1 10/2004 Lys et al.
2004/0212993 A1 10/2004 Morgan et al.
2004/0223328 A1 11/2004 Lee et al.
2004/0240890 A1 12/2004 Lys et al.
2004/0251854 A1 12/2004 Matsuda et al.
2004/0257007 A1 12/2004 Lys et al.
2005/0013133 A1 1/2005 Yeh
2005/0023536 A1 2/2005 Shackle
2005/0024877 A1 2/2005 Frederick
2005/0030744 A1 2/2005 Ducharme et al.
2005/0035728 A1 2/2005 Schanberger et al.
2005/0036300 A1 2/2005 Dowling et al.
2005/0040774 A1 2/2005 Mueller et al.
2005/0041161 A1 2/2005 Dowling et al.
2005/0041424 A1 2/2005 Ducharme
2005/0043907 A1 2/2005 Eckel et al.
2005/0044617 A1 3/2005 Mueller et al.
2005/0047132 A1 3/2005 Dowling et al.
2005/0047134 A1 3/2005 Mueller et al.
2005/0062440 A1 3/2005 Lys et al.
2005/0063194 A1 3/2005 Lys et al.
2005/0078477 A1 4/2005 Lo
2005/0093488 A1 5/2005 Hung et al.
2005/0099824 A1 5/2005 Dowling et al.
2005/0107694 A1 5/2005 Jansen et al.
2005/0110384 A1 5/2005 Peterson
2005/0116667 A1 6/2005 Mueller et al.
2005/0128751 A1 6/2005 Roberge et al.
2005/0141225 A1 6/2005 Striebel
2005/0151489 A1 7/2005 Lys et al.
2005/0151663 A1 7/2005 Tanguay
2005/0154494 A1 7/2005 Ahmed
2005/0162093 A1 7/2005 Timmermans et al.
2005/0162100 A1 7/2005 Romano et al.
2005/0162101 A1 7/2005 Leong et al.
2005/0166634 A1* 8/2005 Lieberman et al. ............... 63/26
2005/0174473 A1 8/2005 Morgan et al.
2005/0174780 A1 8/2005 Park
2005/0184667 A1 8/2005 Sturman et al.
2005/0201112 A1 9/2005 Machi et al.
2005/0206529 A1 9/2005 St.-Germain
2005/0213320 A1 9/2005 Kazuhiro et al.
2005/0213352 A1 9/2005 Lys
2005/0213353 A1 9/2005 Lys
2005/0218838 A1 10/2005 Lys
2005/0218870 A1 10/2005 Lys
2005/0219860 A1 10/2005 Schexnaider
2005/0219872 A1 10/2005 Lys
2005/0225979 A1 10/2005 Robertson et al.
2005/0231133 A1 10/2005 Lys
2005/0236029 A1 10/2005 Dowling
2005/0236998 A1 10/2005 Mueller et al.
2005/0242742 A1 11/2005 Cheang et al.
2005/0243577 A1 11/2005 Moon
2005/0248299 A1 11/2005 Chemel et al.
2005/0253533 A1 11/2005 Lys et al.
2005/0259424 A1 11/2005 Zampini, II et al.
2005/0264474 A1 12/2005 Rast
2005/0265019 A1 12/2005 Sommers et al.
2005/0275626 A1 12/2005 Mueller et al.
2005/0276051 A1 12/2005 Caudle et al.
2005/0276053 A1 12/2005 Nortrup et al.
2005/0276064 A1 12/2005 Wu et al.
2005/0281030 A1 12/2005 Leong et al.
2005/0285547 A1 12/2005 Piepgras et al.
2006/0002110 A1 1/2006 Dowling et al.
2006/0012987 A9 1/2006 Ducharme et al.
2006/0012997 A1 1/2006 Catalano et al.
2006/0016960 A1 1/2006 Morgan et al.
2006/0022214 A1 2/2006 Morgan et al.
2006/0028155 A1 2/2006 Young
2006/0028837 A1 2/2006 Mrakovich
2006/0034078 A1 2/2006 Kovacik et al.
2006/0050509 A9 3/2006 Dowling et al.
2006/0050514 A1 3/2006 Opolka
2006/0056855 A1 3/2006 Nakagawa et al.
2006/0066447 A1 3/2006 Davenport et al.
2006/0076908 A1 4/2006 Morgan et al.
2006/0081863 A1 4/2006 Kim et al.
2006/0091826 A1 5/2006 Chen
2006/0092640 A1 5/2006 Li
2006/0098077 A1 5/2006 Dowling
2006/0104058 A1 5/2006 Chemel et al.
2006/0109648 A1 5/2006 Trenchard et al.
2006/0109649 A1 5/2006 Ducharme et al.
2006/0109661 A1 5/2006 Coushaine et al.
2006/0126325 A1 6/2006 Lefebvre et al.
2006/0126338 A1 6/2006 Mighetto
2006/0132061 A1 6/2006 McCormick et al.
2006/0132323 A1 6/2006 Grady, Jr.
2006/0146531 A1 7/2006 Reo et al.
2006/0152172 A9 7/2006 Mueller et al.
2006/0158881 A1 7/2006 Dowling
2006/0170376 A1 8/2006 Piepgras et al.
2006/0192502 A1 8/2006 Brown et al.
2006/0193131 A1 8/2006 McGrath et al.
2006/0197661 A1 9/2006 Tracy et al.
2006/0198128 A1 9/2006 Piepgras et al.
2006/0208667 A1 9/2006 Lys et al.
2006/0215422 A1 9/2006 Laizure, Jr. et al.
2006/0220595 A1 10/2006 Lu
2006/0221606 A1 10/2006 Dowling et al.
2006/0221619 A1 10/2006 Nishigaki
2006/0227558 A1 10/2006 Osawa et al.
2006/0232974 A1 10/2006 Lee et al.
2006/0238884 A1 10/2006 Jang et al.
2006/0262516 A9 11/2006 Dowling et al.
2006/0262521 A1 11/2006 Piepgras et al.
2006/0262544 A1 11/2006 Piepgras et al.
2006/0262545 A1 11/2006 Piepgras et al.
2006/0265921 A1 11/2006 Korall et al.
2006/0273741 A1 12/2006 Stalker, III
2006/0274529 A1 12/2006 Cao
2006/0285325 A1 12/2006 Ducharme et al.
2007/0035255 A1 2/2007 Shuster et al.
2007/0035538 A1 2/2007 Garcia et al.
2007/0035965 A1 2/2007 Holst
2007/0040516 A1 2/2007 Chen
2007/0041220 A1 2/2007 Lynch
2007/0047227 A1 3/2007 Ducharme

(56) References Cited

U.S. PATENT DOCUMENTS

| | | | |
|---|---|---|---|
| 2007/0053182 | A1 | 3/2007 | Robertson |
| 2007/0053208 | A1 | 3/2007 | Justel et al. |
| 2007/0064419 | A1 | 3/2007 | Gandhi |
| 2007/0064425 | A1 | 3/2007 | Frecska et al. |
| 2007/0070621 | A1 | 3/2007 | Rivas et al. |
| 2007/0070631 | A1 | 3/2007 | Huang et al. |
| 2007/0081423 | A1 | 4/2007 | Chien |
| 2007/0086754 | A1 | 4/2007 | Lys et al. |
| 2007/0086912 | A1 | 4/2007 | Dowling et al. |
| 2007/0097678 | A1 | 5/2007 | Yang |
| 2007/0109763 | A1 | 5/2007 | Wolf et al. |
| 2007/0115658 | A1 | 5/2007 | Mueller et al. |
| 2007/0115665 | A1 | 5/2007 | Mueller et al. |
| 2007/0120463 | A1 | 5/2007 | Hayashi et al. |
| 2007/0120594 | A1 | 5/2007 | Balakrishnan et al. |
| 2007/0127234 | A1 | 6/2007 | Jervey, III |
| 2007/0133202 | A1 | 6/2007 | Huang et al. |
| 2007/0139938 | A1 | 6/2007 | Petroski et al. |
| 2007/0145915 | A1 | 6/2007 | Roberge et al. |
| 2007/0146126 | A1 | 6/2007 | Wang |
| 2007/0147046 | A1 | 6/2007 | Arik et al. |
| 2007/0152797 | A1 | 7/2007 | Chemel et al. |
| 2007/0152808 | A1 | 7/2007 | LaCasse |
| 2007/0153514 | A1 | 7/2007 | Dowling et al. |
| 2007/0159828 | A1 | 7/2007 | Wang |
| 2007/0165402 | A1 | 7/2007 | Weaver, Jr. et al. |
| 2007/0165405 | A1 | 7/2007 | Chen |
| 2007/0173978 | A1 | 7/2007 | Fein et al. |
| 2007/0177382 | A1 | 8/2007 | Pritchard et al. |
| 2007/0182387 | A1 | 8/2007 | Weirich |
| 2007/0188114 | A1 | 8/2007 | Lys et al. |
| 2007/0189026 | A1 | 8/2007 | Chemel et al. |
| 2007/0195526 | A1 | 8/2007 | Dowling et al. |
| 2007/0195527 | A1 | 8/2007 | Russell |
| 2007/0195532 | A1 | 8/2007 | Reisenauer et al. |
| 2007/0200725 | A1 | 8/2007 | Fredericks et al. |
| 2007/0205712 | A1 | 9/2007 | Radkov et al. |
| 2007/0206375 | A1 | 9/2007 | Piepgras et al. |
| 2007/0211461 | A1 | 9/2007 | Harwood |
| 2007/0211463 | A1 | 9/2007 | Chevalier et al. |
| 2007/0228999 | A1 | 10/2007 | Kit |
| 2007/0235751 | A1 | 10/2007 | Radkov et al. |
| 2007/0236156 | A1 | 10/2007 | Lys et al. |
| 2007/0236358 | A1 | 10/2007 | Street et al. |
| 2007/0237284 | A1 | 10/2007 | Lys et al. |
| 2007/0240346 | A1 | 10/2007 | Li et al. |
| 2007/0241657 | A1 | 10/2007 | Radkov et al. |
| 2007/0242466 | A1 | 10/2007 | Wu et al. |
| 2007/0247450 | A1 | 10/2007 | Lee |
| 2007/0247842 | A1 | 10/2007 | Zampini et al. |
| 2007/0247847 | A1 | 10/2007 | Villard |
| 2007/0247851 | A1 | 10/2007 | Villard |
| 2007/0252161 | A1 | 11/2007 | Meis et al. |
| 2007/0258231 | A1 | 11/2007 | Koerner et al. |
| 2007/0258240 | A1 | 11/2007 | Ducharme et al. |
| 2007/0263379 | A1 | 11/2007 | Dowling |
| 2007/0274070 | A1 | 11/2007 | Wedell |
| 2007/0281520 | A1 | 12/2007 | Insalaco et al. |
| 2007/0285926 | A1 | 12/2007 | Maxik |
| 2007/0285933 | A1 | 12/2007 | Southard et al. |
| 2007/0290625 | A1 | 12/2007 | He et al. |
| 2007/0291483 | A1 | 12/2007 | Lys |
| 2007/0296350 | A1 | 12/2007 | Maxik et al. |
| 2008/0003664 | A1 | 1/2008 | Tysoe et al. |
| 2008/0007945 | A1 | 1/2008 | Kelly et al. |
| 2008/0012502 | A1 | 1/2008 | Lys |
| 2008/0012506 | A1 | 1/2008 | Mueller et al. |
| 2008/0013316 | A1 | 1/2008 | Chiang |
| 2008/0013324 | A1 | 1/2008 | Yu |
| 2008/0018261 | A1 | 1/2008 | Kastner |
| 2008/0024067 | A1 | 1/2008 | Ishibashi |
| 2008/0029720 | A1 | 2/2008 | Li |
| 2008/0037226 | A1 | 2/2008 | Shin et al. |
| 2008/0037245 | A1 | 2/2008 | Chan |
| 2008/0037284 | A1 | 2/2008 | Rudisill |
| 2008/0049434 | A1 | 2/2008 | Marsh |
| 2008/0055894 | A1 | 3/2008 | Deng |
| 2008/0062680 | A1 | 3/2008 | Timmermans et al. |
| 2008/0068838 | A1 | 3/2008 | Galke et al. |
| 2008/0068839 | A1 | 3/2008 | Matheson |
| 2008/0074872 | A1 | 3/2008 | Panotopoulos |
| 2008/0089075 | A1 | 4/2008 | Hsu |
| 2008/0092800 | A1 | 4/2008 | Smith et al. |
| 2008/0093615 | A1 | 4/2008 | Lin et al. |
| 2008/0093998 | A1 | 4/2008 | Dennery et al. |
| 2008/0094819 | A1 | 4/2008 | Vaish |
| 2008/0094837 | A1 | 4/2008 | Dobbins et al. |
| 2008/0129211 | A1 | 6/2008 | Lin et al. |
| 2008/0130267 | A1 | 6/2008 | Dowling et al. |
| 2008/0150444 | A1 | 6/2008 | Usui et al. |
| 2008/0151535 | A1 | 6/2008 | de Castris |
| 2008/0158871 | A1 | 7/2008 | McAvoy et al. |
| 2008/0158887 | A1 | 7/2008 | Zhu et al. |
| 2008/0164826 | A1 | 7/2008 | Lys |
| 2008/0164827 | A1 | 7/2008 | Lys |
| 2008/0164854 | A1 | 7/2008 | Lys |
| 2008/0175003 | A1 | 7/2008 | Tsou et al. |
| 2008/0180036 | A1 | 7/2008 | Garrity et al. |
| 2008/0185961 | A1 | 8/2008 | Hong |
| 2008/0186704 | A1 | 8/2008 | Chou et al. |
| 2008/0192436 | A1 | 8/2008 | Peng et al. |
| 2008/0198598 | A1 | 8/2008 | Ward |
| 2008/0211386 | A1 | 9/2008 | Choi et al. |
| 2008/0211419 | A1 | 9/2008 | Garrity |
| 2008/0218993 | A1 | 9/2008 | Li |
| 2008/0224629 | A1 | 9/2008 | Melanson |
| 2008/0224636 | A1 | 9/2008 | Melanson |
| 2008/0253125 | A1 | 10/2008 | Kang et al. |
| 2008/0258631 | A1 | 10/2008 | Wu et al. |
| 2008/0258647 | A1 | 10/2008 | Scianna |
| 2008/0278092 | A1 | 11/2008 | Lys et al. |
| 2008/0285257 | A1 | 11/2008 | King |
| 2008/0285266 | A1 | 11/2008 | Thomas |
| 2008/0290814 | A1 | 11/2008 | Leong et al. |
| 2008/0291675 | A1 | 11/2008 | Lin et al. |
| 2008/0298080 | A1 | 12/2008 | Wu et al. |
| 2008/0310119 | A1 | 12/2008 | Giacoma |
| 2008/0315773 | A1 | 12/2008 | Pang |
| 2008/0315784 | A1 | 12/2008 | Tseng |
| 2009/0002995 | A1 | 1/2009 | Lee et al. |
| 2009/0010022 | A1 | 1/2009 | Tsai |
| 2009/0016063 | A1 | 1/2009 | Hu |
| 2009/0021140 | A1 | 1/2009 | Takasu et al. |
| 2009/0046473 | A1 | 2/2009 | Tsai et al. |
| 2009/0052186 | A1 | 2/2009 | Xue |
| 2009/0059557 | A1 | 3/2009 | Tanaka |
| 2009/0059559 | A1 | 3/2009 | Pabst et al. |
| 2009/0059603 | A1 | 3/2009 | Recker et al. |
| 2009/0067170 | A1 | 3/2009 | Bloemen et al. |
| 2009/0067182 | A1 | 3/2009 | Hsu et al. |
| 2009/0073693 | A1 | 3/2009 | Nall et al. |
| 2009/0085500 | A1 | 4/2009 | Zampini, II et al. |
| 2009/0086492 | A1 | 4/2009 | Meyer |
| 2009/0091929 | A1 | 4/2009 | Faubion |
| 2009/0091938 | A1 | 4/2009 | Jacobson et al. |
| 2009/0101930 | A1 | 4/2009 | Li |
| 2009/0139690 | A1 | 6/2009 | Maerz et al. |
| 2009/0140285 | A1 | 6/2009 | Lin et al. |
| 2009/0175041 | A1 | 7/2009 | Yuen et al. |
| 2009/0185373 | A1 | 7/2009 | Grajcar |
| 2009/0189540 | A1 | 7/2009 | Huang et al. |
| 2009/0195186 | A1 | 8/2009 | Guest et al. |
| 2009/0196034 | A1 | 8/2009 | Gherardini et al. |
| 2009/0213588 | A1 | 8/2009 | Manes |
| 2009/0219713 | A1 | 9/2009 | Siemiet et al. |
| 2009/0231831 | A1 | 9/2009 | Hsiao et al. |
| 2009/0268461 | A1 | 10/2009 | Deak et al. |
| 2009/0273924 | A1 | 11/2009 | Chiang |
| 2009/0273926 | A1 | 11/2009 | Deng |
| 2009/0284169 | A1 | 11/2009 | Valois |
| 2009/0290334 | A1 | 11/2009 | Ivey et al. |
| 2009/0295776 | A1 | 12/2009 | Yu et al. |
| 2009/0296381 | A1 | 12/2009 | Dubord |
| 2009/0303720 | A1 | 12/2009 | McGrath |

(56) References Cited

U.S. PATENT DOCUMENTS

| | | | |
|---|---|---|---|
| 2009/0316408 | A1 | 12/2009 | Villard |
| 2010/0008085 | A1 | 1/2010 | Ivey et al. |
| 2010/0019689 | A1 | 1/2010 | Shan |
| 2010/0027259 | A1 | 2/2010 | Simon et al. |
| 2010/0033095 | A1 | 2/2010 | Sadwick |
| 2010/0033964 | A1 | 2/2010 | Choi et al. |
| 2010/0046210 | A1 | 2/2010 | Mathai et al. |
| 2010/0046222 | A1 | 2/2010 | Yang |
| 2010/0071946 | A1 | 3/2010 | Hashimoto |
| 2010/0073944 | A1 | 3/2010 | Chun |
| 2010/0079085 | A1 | 4/2010 | Wendt et al. |
| 2010/0096992 | A1 | 4/2010 | Yamamoto et al. |
| 2010/0096998 | A1 | 4/2010 | Beers |
| 2010/0103664 | A1 | 4/2010 | Simon et al. |
| 2010/0103673 | A1 | 4/2010 | Ivey et al. |
| 2010/0109550 | A1 | 5/2010 | Huda et al. |
| 2010/0109558 | A1 | 5/2010 | Chew |
| 2010/0141173 | A1 | 6/2010 | Negrete |
| 2010/0148650 | A1 | 6/2010 | Wu et al. |
| 2010/0149806 | A1 | 6/2010 | Yiu |
| 2010/0157608 | A1 | 6/2010 | Chen et al. |
| 2010/0164404 | A1 | 7/2010 | Shao et al. |
| 2010/0181178 | A1 | 7/2010 | Chang et al. |
| 2010/0201269 | A1 | 8/2010 | Tzou et al. |
| 2010/0207547 | A1 | 8/2010 | Koroki et al. |
| 2010/0220469 | A1 | 9/2010 | Ivey et al. |
| 2010/0237790 | A1 | 9/2010 | Peng |
| 2010/0265716 | A1* | 10/2010 | Hood et al. .................. 362/282 |
| 2010/0265732 | A1 | 10/2010 | Liu |
| 2010/0270925 | A1 | 10/2010 | Withers |
| 2010/0277069 | A1 | 11/2010 | Janik et al. |
| 2010/0289418 | A1 | 11/2010 | Langovsky |
| 2010/0308733 | A1 | 12/2010 | Shao |
| 2010/0309652 | A1 | 12/2010 | Shen et al. |
| 2010/0320922 | A1 | 12/2010 | Palazzolo et al. |
| 2011/0006658 | A1 | 1/2011 | Chan et al. |
| 2011/0090682 | A1 | 4/2011 | Zheng et al. |
| 2011/0109454 | A1 | 5/2011 | McSheffrey, Sr. |
| 2011/0112661 | A1 | 5/2011 | Jung et al. |
| 2011/0156584 | A1 | 6/2011 | Kim |
| 2011/0176298 | A1 | 7/2011 | Meurer et al. |
| 2011/0199723 | A1 | 8/2011 | Sato |
| 2011/0199769 | A1 | 8/2011 | Bretschneider et al. |
| 2011/0204777 | A1 | 8/2011 | Lenk |
| 2011/0291588 | A1 | 12/2011 | Tagare |
| 2012/0014086 | A1 | 1/2012 | Jonsson |
| 2012/0043892 | A1 | 2/2012 | Visser et al. |
| 2012/0063140 | A1 | 3/2012 | Kong |
| 2012/0080994 | A1 | 4/2012 | Chin et al. |
| 2012/0081891 | A1 | 4/2012 | Tung et al. |
| 2012/0098439 | A1 | 4/2012 | Recker et al. |
| 2012/0106144 | A1 | 5/2012 | Chang |
| 2012/0113628 | A1 | 5/2012 | Burrow et al. |
| 2012/0127726 | A1 | 5/2012 | Yen |
| 2012/0146503 | A1 | 6/2012 | Negley et al. |
| 2012/0147597 | A1 | 6/2012 | Farmer |
| 2012/0153865 | A1 | 6/2012 | Rolfes et al. |
| 2012/0155073 | A1 | 6/2012 | McCanless et al. |
| 2012/0161666 | A1 | 6/2012 | Antony et al. |
| 2012/0194086 | A1 | 8/2012 | Liu et al. |
| 2012/0195032 | A1 | 8/2012 | Shew |
| 2012/0212951 | A1 | 8/2012 | Lai et al. |
| 2012/0212953 | A1 | 8/2012 | Bloom et al. |
| 2012/0230044 | A1 | 9/2012 | Zhang et al. |
| 2012/0236533 | A1 | 9/2012 | Nakamura et al. |
| 2012/0236554 | A1 | 9/2012 | Rust |
| 2012/0243216 | A1 | 9/2012 | Lai et al. |
| 2012/0243217 | A1 | 9/2012 | Szprengiel et al. |
| 2012/0274214 | A1 | 11/2012 | Radermacher et al. |
| 2012/0275154 | A1 | 11/2012 | Hood et al. |
| 2012/0293991 | A1 | 11/2012 | Lin |
| 2012/0293996 | A1 | 11/2012 | Thomas et al. |
| 2012/0300445 | A1 | 11/2012 | Chu et al. |
| 2012/0300468 | A1 | 11/2012 | Chang et al. |
| 2012/0300486 | A1 | 11/2012 | Matsushita et al. |
| 2012/0307524 | A1 | 12/2012 | Schapira et al. |
| 2012/0320598 | A1 | 12/2012 | Son |
| 2013/0039051 | A1 | 2/2013 | Wu |
| 2013/0044471 | A1 | 2/2013 | Chen |
| 2013/0044476 | A1 | 2/2013 | Bretschneider et al. |
| 2013/0050997 | A1 | 2/2013 | Bretschneider et al. |
| 2013/0050998 | A1 | 2/2013 | Chu et al. |
| 2013/0057146 | A1 | 3/2013 | Chao |
| 2013/0058079 | A1 | 3/2013 | Dellian et al. |
| 2013/0063944 | A1 | 3/2013 | Lodhie et al. |
| 2013/0077297 | A1 | 3/2013 | Wu et al. |
| 2013/0094200 | A1 | 4/2013 | Dellian et al. |
| 2013/0148349 | A1 | 6/2013 | Pasqualini et al. |
| 2013/0200797 | A1 | 8/2013 | Timmermans et al. |
| 2013/0201690 | A1 | 8/2013 | Vissenberg et al. |
| 2013/0206597 | A1 | 8/2013 | Wang et al. |
| 2013/0221867 | A1 | 8/2013 | Deppe et al. |
| 2013/0258668 | A1 | 10/2013 | Dellian et al. |

FOREIGN PATENT DOCUMENTS

| | | | |
|---|---|---|---|
| CN | 2869556 | Y | 2/2007 |
| CN | 101016976 | A | 8/2007 |
| CN | 101075605 | A | 11/2007 |
| CN | 201129681 | Y | 10/2008 |
| CN | 201184574 | Y | 1/2009 |
| CN | 101737664 | A1 | 6/2010 |
| DE | 19651140 | A1 | 6/1997 |
| DE | 19624087 | A1 | 12/1997 |
| DE | 29819966 | U1 | 3/1999 |
| DE | 29900320 | U1 | 5/1999 |
| DE | 29817609 | U1 | 1/2000 |
| DE | 20018865 | U1 | 2/2001 |
| EP | 0013782 | B1 | 3/1983 |
| EP | 0091172 | A2 | 10/1983 |
| EP | 0124924 | B1 | 9/1987 |
| EP | 0174699 | B1 | 11/1988 |
| EP | 0197602 | B1 | 11/1990 |
| EP | 0214701 | B1 | 3/1992 |
| EP | 0262713 | B1 | 6/1992 |
| EP | 0203668 | B1 | 2/1993 |
| EP | 0272749 | B1 | 8/1993 |
| EP | 0337567 | B1 | 11/1993 |
| EP | 0390262 | B1 | 12/1993 |
| EP | 0359329 | B1 | 3/1994 |
| EP | 0403011 | B1 | 4/1994 |
| EP | 0632511 | | 1/1995 |
| EP | 0432848 | B1 | 4/1995 |
| EP | 0659531 | A1 | 6/1995 |
| EP | 0403001 | B1 | 8/1995 |
| EP | 0525876 | | 5/1996 |
| EP | 0714556 | | 1/1999 |
| EP | 0889283 | A1 | 7/1999 |
| EP | 0458408 | B1 | 9/1999 |
| EP | 0578302 | B1 | 9/1999 |
| EP | 0723701 | B1 | 1/2000 |
| EP | 0787419 | B1 | 5/2001 |
| EP | 1195740 | A2 | 4/2002 |
| EP | 1016062 | B1 | 8/2002 |
| EP | 1195740 | A3 | 1/2003 |
| EP | 1149510 | B1 | 2/2003 |
| EP | 1056993 | B1 | 3/2003 |
| EP | 0766436 | B1 | 5/2003 |
| EP | 0924281 | B1 | 5/2003 |
| EP | 0826167 | B1 | 6/2003 |
| EP | 1147686 | B1 | 1/2004 |
| EP | 1142452 | B1 | 3/2004 |
| EP | 1145602 | B1 | 3/2004 |
| EP | 1422975 | A1 | 5/2004 |
| EP | 0890059 | B1 | 6/2004 |
| EP | 1348319 | B1 | 6/2005 |
| EP | 1037862 | B1 | 7/2005 |
| EP | 1346609 | B1 | 8/2005 |
| EP | 1321012 | B1 | 12/2005 |
| EP | 1610593 | | 12/2005 |
| EP | 1624728 | A1 | 2/2006 |
| EP | 1415517 | B1 | 5/2006 |
| EP | 1415518 | B1 | 5/2006 |
| EP | 1438877 | B1 | 5/2006 |

(56) References Cited

FOREIGN PATENT DOCUMENTS

| | | | |
|---|---|---|---|
| EP | 1166604 | B1 | 6/2006 |
| EP | 1479270 | B1 | 7/2006 |
| EP | 1348318 | B1 | 8/2006 |
| EP | 1399694 | B1 | 8/2006 |
| EP | 1461980 | B1 | 10/2006 |
| EP | 1110120 | B1 | 4/2007 |
| EP | 1440604 | B1 | 4/2007 |
| EP | 1047903 | B1 | 6/2007 |
| EP | 1500307 | | 6/2007 |
| EP | 0922305 | B1 | 8/2007 |
| EP | 0922306 | B1 | 8/2007 |
| EP | 1194918 | B1 | 8/2007 |
| EP | 1833035 | A1 | 9/2007 |
| EP | 1048085 | B1 | 11/2007 |
| EP | 1852648 | A1 | 11/2007 |
| EP | 1763650 | B1 | 12/2007 |
| EP | 1776722 | B1 | 1/2008 |
| EP | 1873012 | | 1/2008 |
| EP | 1459599 | B1 | 2/2008 |
| EP | 1887836 | A2 | 2/2008 |
| EP | 1579733 | B1 | 4/2008 |
| EP | 1145282 | B1 | 7/2008 |
| EP | 1157428 | B1 | 9/2008 |
| EP | 1000522 | B1 | 12/2008 |
| EP | 1502483 | B1 | 12/2008 |
| EP | 1576858 | B1 | 12/2008 |
| EP | 1646092 | B1 | 1/2009 |
| EP | 1579736 | B1 | 2/2009 |
| EP | 1889519 | | 3/2009 |
| EP | 1537354 | B1 | 4/2009 |
| EP | 1518445 | B1 | 5/2009 |
| EP | 1337784 | B1 | 6/2009 |
| EP | 2013530 | B1 | 8/2009 |
| EP | 1461982 | B1 | 9/2009 |
| EP | 2333407 | A1 | 6/2011 |
| EP | 2430888 | | 3/2012 |
| EP | 2469155 | A1 | 6/2012 |
| EP | 2573457 | A1 | 3/2013 |
| EP | 2554895 | A1 | 6/2013 |
| FR | 2813115 | | 2/2002 |
| GB | 2215024 | A | 9/1989 |
| GB | 2324901 | A | 11/1998 |
| GB | 2447257 | A | 9/2008 |
| GB | 2472345 | A | 2/2011 |
| GB | 2486410 | A | 6/2012 |
| GB | 2495647 | A | 4/2013 |
| JP | S68248271 | A | 10/1987 |
| JP | 06-054289 | | 2/1994 |
| JP | H6-54103 | U | 7/1994 |
| JP | 07-249467 | | 9/1995 |
| JP | 7264036 | | 10/1995 |
| JP | 08-162677 | A | 6/1996 |
| JP | H11-135274 | A | 5/1999 |
| JP | H11-162234 | A | 6/1999 |
| JP | H11-260125 | A | 9/1999 |
| JP | 2001-238272 | A | 8/2001 |
| JP | 2001-291406 | A | 10/2001 |
| JP | 2002-141555 | A | 5/2002 |
| JP | 3098271 | U | 2/2004 |
| JP | 2004-119078 | A | 4/2004 |
| JP | 2004-273234 | A | 9/2004 |
| JP | 2004-335426 | | 11/2004 |
| JP | 2005-158363 | A | 6/2005 |
| JP | 2005-166617 | A | 6/2005 |
| JP | 2005-347214 | A | 12/2005 |
| JP | 2006-507641 | A | 3/2006 |
| JP | 2005-322866 | A | 12/2006 |
| JP | 2007-227342 | A | 9/2007 |
| JP | 3139714 | U | 2/2008 |
| JP | 2008-186758 | A | 8/2008 |
| JP | 2008-258124 | A | 10/2008 |
| JP | 2008-293753 | A | 12/2008 |
| JP | 3154200 | | 9/2009 |
| JP | 2010-15754 | | 1/2010 |
| JP | 2010-192229 | A1 | 9/2010 |
| JP | 2010-205553 | A | 9/2010 |
| JP | 5102530 | B2 | 12/2012 |
| KR | 10-2004-0008244 | A | 1/2004 |
| KR | 10-2006-0112113 | A | 10/2006 |
| KR | 20-0430022 | Y1 | 11/2006 |
| KR | 10-2006-0133784 | A | 12/2006 |
| KR | 10-2007-0063595 | A | 6/2007 |
| KR | 10-0781652 | | 12/2007 |
| KR | 10-0844538 | B1 | 7/2008 |
| KR | 10-0888669 | B1 | 3/2009 |
| KR | 10-0927851 | B1 | 11/2009 |
| TW | M337036 | | 7/2008 |
| TW | M349465 | U | 1/2009 |
| WO | WO9906759 | A1 | 2/1999 |
| WO | WO9910867 | A1 | 3/1999 |
| WO | WO9931560 | A2 | 6/1999 |
| WO | WO9945312 | A1 | 9/1999 |
| WO | WO9957945 | A1 | 11/1999 |
| WO | WO0001067 | A2 | 1/2000 |
| WO | WO2011072308 | A1 | 6/2001 |
| WO | WO0225842 | A2 | 3/2002 |
| WO | WO02061330 | A2 | 8/2002 |
| WO | WO02069306 | A2 | 9/2002 |
| WO | WO02091805 | A2 | 11/2002 |
| WO | WO02098182 | A2 | 12/2002 |
| WO | WO02099780 | A2 | 12/2002 |
| WO | WO03026358 | A1 | 3/2003 |
| WO | WO03055273 | A2 | 7/2003 |
| WO | WO03067934 | A2 | 8/2003 |
| WO | WO03090890 | A1 | 11/2003 |
| WO | WO03096761 | A1 | 11/2003 |
| WO | WO2004021747 | A2 | 3/2004 |
| WO | WO2004023850 | A2 | 3/2004 |
| WO | WO2004032572 | A2 | 4/2004 |
| WO | WO2004057924 | A1 | 7/2004 |
| WO | WO2004100624 | A2 | 11/2004 |
| WO | WO2005031860 | A2 | 4/2005 |
| WO | WO2005052751 | A2 | 6/2005 |
| WO | WO2005060309 | A2 | 6/2005 |
| WO | WO2005116519 | A1 | 8/2005 |
| WO | WO2005084339 | A2 | 9/2005 |
| WO | WO2005089293 | A2 | 9/2005 |
| WO | WO2005089309 | A2 | 9/2005 |
| WO | WO2005103555 | A1 | 11/2005 |
| WO | WO2006023149 | A2 | 3/2006 |
| WO | WO2006044328 | A1 | 4/2006 |
| WO | WO2006046207 | A1 | 5/2006 |
| WO | WO2006056120 | A1 | 6/2006 |
| WO | WO2006093889 | A2 | 9/2006 |
| WO | WO2006095315 | | 9/2006 |
| WO | WO2006095316 | | 9/2006 |
| WO | WO2006127666 | A2 | 11/2006 |
| WO | WO2006127785 | A2 | 11/2006 |
| WO | WO2006133272 | A2 | 12/2006 |
| WO | WO2006137686 | A1 | 12/2006 |
| WO | WO2007004679 | A1 | 1/2007 |
| WO | WO2007081674 | A1 | 7/2007 |
| WO | WO2007090292 | A1 | 8/2007 |
| WO | WO2007094810 | A2 | 8/2007 |
| WO | WO2008018002 | A2 | 2/2008 |
| WO | WO2008027093 | A2 | 3/2008 |
| WO | WO2008061991 | A1 | 5/2008 |
| WO | WO2008110978 | A1 | 9/2008 |
| WO | WO2008129488 | | 10/2008 |
| WO | WO2008137460 | | 11/2008 |
| WO | WO2009061124 | A2 | 5/2009 |
| WO | WO2009067074 | A1 | 5/2009 |
| WO | WO2009111978 | A1 | 9/2009 |
| WO | WO2009143047 | A2 | 11/2009 |
| WO | WO2010014437 | A2 | 2/2010 |
| WO | WO2010030509 | A2 | 3/2010 |
| WO | WO2010047896 | A2 | 4/2010 |
| WO | WO2010047898 | A2 | 4/2010 |
| WO | WO2010047973 | A2 | 4/2010 |
| WO | WO2010069983 | A1 | 6/2010 |
| WO | WO2010083370 | A2 | 7/2010 |
| WO | WO2010088105 | A3 | 8/2010 |
| WO | WO2010132625 | A2 | 11/2010 |
| WO | WO2010141537 | A2 | 12/2010 |

(56) References Cited

FOREIGN PATENT DOCUMENTS

| | | | |
|---|---|---|---|
| WO | WO2011005562 | | 1/2011 |
| WO | WO2011005579 | A2 | 1/2011 |
| WO | WO2011021719 | A1 | 2/2011 |
| WO | WO2011074884 | A2 | 6/2011 |
| WO | WO2011113709 | A1 | 9/2011 |
| WO | WO2011117059 | A1 | 9/2011 |
| WO | WO2011159436 | A2 | 12/2011 |
| WO | WO2012001584 | A1 | 1/2012 |
| WO | WO2012004708 | A2 | 1/2012 |
| WO | WO2012007899 | A1 | 1/2012 |
| WO | WO2012019535 | A1 | 2/2012 |
| WO | WO2012025626 | A1 | 3/2012 |
| WO | WO2012063174 | A2 | 5/2012 |
| WO | WO2012117018 | A1 | 9/2012 |
| WO | WO2012129301 | A1 | 9/2012 |
| WO | WO2012131522 | A1 | 10/2012 |
| WO | WO2012131547 | A1 | 10/2012 |
| WO | WO2013028965 | A2 | 2/2013 |
| WO | WO2013029960 | A1 | 3/2013 |
| WO | WO2013030128 | A2 | 3/2013 |
| WO | WO2013045255 | A1 | 4/2013 |
| WO | WO2013045439 | A1 | 4/2013 |
| WO | WO2013057660 | A2 | 4/2013 |
| WO | WO2013079242 | A1 | 6/2013 |
| WO | WO2013088299 | A1 | 6/2013 |
| WO | WO2013097823 | A1 | 7/2013 |
| WO | WO2013098700 | A1 | 7/2013 |
| WO | WO2013113548 | A1 | 8/2013 |
| WO | WO2013113661 | A1 | 8/2013 |
| WO | WO2013121347 | A1 | 8/2013 |
| WO | WO2013156905 | A1 | 10/2013 |
| WO | WO2013167419 | A1 | 11/2013 |

OTHER PUBLICATIONS

Lawrence Berkeley National Labratory. Lighting Control System—Phase Cut Carrier. University of California, [online] [retrieved on Jan. 14, 2008] Retrieved from Lawrence Berkeley National Labratory web page using Internet <URL: http://www.lbl.gov/tt/techs/lbnl1871.html>.

LCD Optics 101 Tutorial [online]. 3M Corporation, [retrieved on Jan. 6, 2010]. Retrieved from the internet: <URL: http://solutions.3m.com/wps/portal/3M/en_US/Vikuiti1/BrandProducts/secondary/optics101/>.

LED Lights, Replacement LED lamps for any incandescent light, [online], [retrieved on Jan. 13, 2000] Retrieved from LED Lights Web Page using Internet <URL: http://www.ledlights.com/replac.htm>.

Ledtronics, Ledtronics Catalog, 1996, p. 10, Ledtronics, Torrance, California.

Phason Electronic Control Systems, Light Level Controller (LLC) case study. Nov. 30, 2004. 3 pages, Phason Inc., Winnipeg, Manitoba, Canada.

Philips. Sense and Simplicity—Licensing program for LED Luminaires and Retrofits, Philips Intellectual Property & Standards, May 5, 2009.

Piper. The Best Path to Efficiency. Building Operating Management, Trade Press Publishing Company May 2000 [online], [retrieved on Jan. 17, 2008]. Retrieved from Find Articles Web Page using Internet <URL:http://findarticles.com/p/articles/mi_qu3922/is_200005/ai_n8899499/>.

PLC-81756-AL "Fireball" Contemporary Pendant Light, [online], [retrieved on Feb. 27, 2009] Retrieved from the Arcadian Lighting Web Page using Internet <URL: http://www.arcadianlighting .com/plc-81756-al.html>.

PLC-96973-PC PLC Lighting Elegance Modern/Contemporary Pendant Light, [online], [retrieved on Feb. 27, 2009].Retrieved from the Arcadian Lighting Web Page using Internet <URL: http/www.arcadianlighting.com/plc-96978-pc.html>.

Saha et al, "Location Determination of a Mobile Device using IEEE 802.11 Access Point Signals", May 5, 2002 in 20 pages.

Sensor Switch, nLight Lighting Control System, [online], [retrieved on Jan. 11, 2008] Retrieved from Sensor Switch web page using Internet <URL: http://www.sensorswitch.com>.

Six Strategies, [online], [retrieved on Jan. 11, 2008] Retrieved from Encelium Technologies Inc. Web Page using Internet <URL: http://www.encelium.com/products/strategies.html>.

Spencer, Eugene. High Sales, Low Utilization. Green Intelligent Buildings, Feb. 1, 2007. [online]. Retrieved from Green Intelligent Buildings web page using Internet <URL: http://www.greenintelligentbuildings.com/CDA/IBT_Archive/BNP_GUID_9-5-2006_A_10000000000000056772>.

Supplementary European Search Report for corresponding European Application No. 10797603.7 mailed Aug. 5, 2013 in 5 pages.

Supplementary European Search Report for corresponding European Application No. 09822381.1 mailed Jan. 4, 2013 in 5 pages.

Supplementary European Search Report dated Feb. 22, 2012 from European Patent Application No. 09822424.9.

Telecite Products & Services—Display Options, [online], [retrieved on Jan. 13, 2000] Retrieved from Telecite Web page using Internet <URL: http://www.telecite.com/en/products/options en.htm>.

Traffic Signal Products—Transportation Products Group, [online], [retrieved on Jan. 13, 2000] Retrieved from the Dialight Web Page using Internet <URL: http://www.dialight.com/trans.htm>.

Truck-Lite, LEDSelect—LED, Model 35, Clearance & Marker Lighting, [online], [retrieved on Jan. 13, 2000] Retrieved from Truck-Lite Web Page using Internet <URL: http://trucklite.com/leds14.html>.

Truck-Lite, LEDSelect—LED, Model 45, Stop, Turn & Tail Lighting [online], [retrieved on Jan. 13, 2000] Retrieved from Truck-Lite Web Page using Internet <URL: http://trucklite.com/leds4.html>.

Truck-Lite, LEDSelect—LED, Super 44, Stop, Turn & Tail Lighting, [online], [retrieved on Jan. 13, 2000] Retrieved from Truck-Lite Web Page using Internet <URL: http://trucklite.com/leds2.html>.

Wolsey, Robert. Interoperable Systems: The Future of Lighting Control, Lighting Research Center, Jan. 1, 1997, vol. 2 No. 2, Rensselaer Polytechnic Institute, Troy, New York [online]. Retrieved Lighting Research Center Web Page using Internet <URL: http://www.lrc.rpi.edu/programs/Futures/LF-BAS/index.asp>.

Notification of Transmittal, the International Search Report and the Written Opinion of the International Searching Authority dated May 7, 2012 from the corresponding International Application No. PCT/US2011/058312.

Bose, "Modern Power Electronics, Evolution, Technology and Applications", 1992, IEEE Press, pp. 14-15.

Kularatna, "Power Electronics Design Handbook, Low-power Components and Applications", 1998, Newns, pp. 71-75.

Lighting Handbook, 8th Edition, Illuminating Engineering Society of North America, 1993, pp. 237-240.

Hodapp, "Chapter 6: Applications for High-Brightness Light-Emitting Diodes", Hodapp, Academic Press, 1997, pp. 334-336, "High Brightness Light Emitting Diodes",Stringfellow et al., volume editors.

Best Practice Guide—Commercial Office Buildings—Central HVAC System. [online], [Retrieved on Jan. 17, 2008] Retrieved from Flex Your Power Organization web page using Internet <URL: http://www.fypower.org/bpg/module.html?b=offices&m+Central HVAC Systems&s=Contr . . . >.

Airport International. Fly High With Intelligent Airport Building and Security Solutions [online], [retrieved on Oct. 24, 2008]. Retrieved from Airport International web page using Internet <URL: http://www.airport-int.com/categories/airport-building-and-security-solutions/fly-high-with-intelligent-airport-building-and-security-solutions.html>.

Cornell University. Light Canopy—Cornell University Solar Decathlon, [online], [retrieved on Jan. 17, 2008] Retrieved from Cornell University web page using Internet <URL: http://cusd.cornell.edu/cusd/web/index.php/page/show/section/Design/page/controls>.

D.N.A.-III, [online], [retrieved Mar. 10, 2009] Retrieved from the PLC Lighting Web Page using Internet <URL: http://www.plclighting.com/product_info.php?cPath=1&products_id=92>.

E20112-22 Starburst Collection, [online], [retrieved on Jul. 10, 2010] Retrieved from ET2 Contemporary Lighting using Internet <URL: http://www.et2online.com/proddetail.aspx?ItemID=E20112-22>.

(56) References Cited

OTHER PUBLICATIONS

E20116-18 Larmes Collection, [online], [retrieved on Jul. 10, 2010] Retrieved from ET2 Contemporary Lighting using Internet <URL: http://www.et2online.com/proddetail.aspx?ItemID=E20116-18>.
E20524-10 & E20525-10 Curva Collection, [online], [retrieved on Jul. 10, 2010] Retrieved from ET2 Contemporary Lighting using Internet <URL: http://www.et2online.com/proddetail.aspx?ItemID=E20524-10 & E20525-10>.
E20743-09 Stealth Collection, [online], [retrieved on Jul. 10, 2010] Retrieved from ET2 Contemporary Lighting using Internet <URL: http://www.et2online.com/proddetail.aspx?ItemID=E20743-09>.
E22201-44 Esprit Collection, [online], [retrieved on Jul. 10, 2010] Retrieved from ET2 Contemporary Lighting using Internet <URL: http://www.et2online.com/proddetail.aspx?ItemID=E22201-44>.
Extended European Search Report for co-pending European Application No. 10 73 2124 mailed on Dec. 13, 2012 in 8 pages.
Extended European Search Report for co-pending European Application No. 09822425.6 mailed on Aug. 30, 2012 in 9 pages.
Extended European Search Report for co-pending European Application No. 10797596.3 mailed on Jan. 17, 2013 in 11 pages.
Extended European Search Report for co-pending European Application No. 10736237.8 mailed on Oct. 19, 2012 in 5 pages.
Extended European Search report for co-pending European Application No. 10738925.6 mailed on Oct. 1, 2012 in 7 pages.
Extended European Search Report for co-pending European Application No. 11760309 mailed on Sep. 30, 2013 in 7 pages.
Examination and Search Report mailed on Jul. 2, 2012 in cooresponding United Kingdom Application No. 1018896.9 in 4 pages.
Experiment Electronic Ballast. Electronic Ballast for Fluorescent Lamps [online], Revised Fall of 2007. [Retrieved on Sep. 1, 1997]. Retrieved from Virginia Tech Web Page using Internet <URL: http://www.ece.vt.edu/ece3354/labs/ballast.pdf.>.
Henson, Keith. The Benefits of Building Systems Integration, Access Control & Security Systems Integration, Oct. 1, 2000, Penton Media. [online], [retrieved on Oct. 24, 2008] Retrieved from Security Solutions Web page using Internet <URL: http://securitysolutions.com/mag/security_benefits_building_systems/>.
Hightower et al, "A Survey and Taxonomy of Location Systems for Ubiquitous Computing", University of Washington, Computer Science and Engineering, Technical Report UW-CSE Jan. 8, 2003, IEEE, Aug. 24, 2001 in 29 pages.
International Search Report and Written Opinion dated Jan. 4, 2010 from the corresponding International Application No. PCT/US2009/044313 filed May 18, 2009.
International Search Report and Written Opinion dated Feb. 7, 2011 from the corresponding International Application No. PCT/US2010/039678 filed Jun. 23, 2010.
International Search Report and Written Opinion dated May 7, 2010 from the corresponding International Application No. PCT/US2009/057109 filed on Sep. 16, 2009.
International Search Report and Written Opinion dated Apr. 8, 2010 from the corresponding International Application No. PCT/2009/055114 filed on Aug. 27, 2009.
International Search Report and Written Opinion dated Feb. 8, 2011 from the corresponding International Application No. PCT/US2010/039608 filed Jun. 23, 2010.
International Search Report and Written Opinion dated Dec. 13, 2010 from the corresponding International Application No. PCT/US2010/037006 filed Jun. 2, 2010.
International Search Report and Written Opinion dated Mar. 13, 2012 from the corresponding International Application No. PCT/US2011/052995 filed on Sep. 23, 2011.
International Search Report and Written Opinion dated May 14, 2010 from the corresponding International Application No. PCT/US2009/060085 filed Oct. 9, 2009.
International Search Report and Written Opinion dated Aug. 16, 2010 from the corresponding International Application No. PCT/US2010/021131 filed on Jan. 15, 2010.
International Search Report and Written Opinion dated Jul. 16, 2009 from the corresponding International Application No. PCT/US2008/084650 filed Nov. 25, 2008.
International Search Report and Written Opinion dated Aug. 17, 2010 from the corresponding International Application No. PCT/US2010/021489 filed on Jan. 20, 2010.
International Search Report and Written Opinion dated Jul. 17, 2009 from the corresponding International Application No. PCT/US2008/085118 filed Dec. 1, 2008.
International Search Report and Written Opinion dated Nov. 21, 2011 from the corresponding International Application No. PCT/US2011/029932 filed on Mar. 25, 2011.
International Search Report and Written Opinion dated Mar. 22, 2010 from the corresponding International Application No. PCT/US2009/053853 filed Aug. 14, 2009.
International Search Report and Written Opinion dated Nov. 23, 2011 from the corresponding International Application No. PCT/US2011/042761 filed on Jul. 1, 2011.
International Search Report and Written Opinion dated Nov. 23, 2011 from the corresponding International Application No. PCT/US2011/042775 filed on Jul. 1, 2011.
International Search Report and Written Opinion dated Dec. 24, 2010 from the corresponding International Application No. PCT/US2010/034635 filed May 13, 2010.
International Search Report and Written Opinion dated May 24, 2010 from the corresponding International Application No. PCT/2009/060083 filed Oct. 9, 2009.
International Search Report and Written Opinion dated May 24, 2010 from the corresponding International Application No. PCT/US2009/060087 filed Oct. 9, 2009.
International Search Report and Written Opinion dated Aug. 25, 2009 from corresponding International Application No. PCT/US2009/031049 filed Jan. 15, 2009.
International Search Report and Written Opinion dated Jan. 25, 2010 from the corresponding International Application No. PCT/US2009/048623 filed Jun. 25, 2009.
International Search Report and Written Opinion dated Feb. 26, 2010 from the corresponding International Application No. PCT/US2009/050949 filed Jul. 17, 2009.
International Search Report and Written Opinion dated Apr. 30, 2010 from the corresponding International Application No. PCT/US2009/057072 filed on Sep. 16, 2009.
International Search Report and Written Opinion dated Jul. 30, 2010 from the corresponding International Application No. PCT/US2010/021448 filed on Jan. 20, 2010.
International Search Report and Written Opinion dated Sep. 30, 2011 from the corresponding International Application No. PCT/US2011/029905 filed on Mar. 25, 2011.
International Search Report and Written Opinion dated Feb. 6, 2012 from the corresponding International Application No. PCT/US2011/043524 filed on Jul. 11, 2011.
International Search Report and Written Opinion dated Feb. 15, 2013 from the corresponding International Application No. PCT/US22012/052244 filed on Aug. 24, 2012.
International Search Report and Written Opinion dated Aug. 30, 2011 for the corresponding International Application No. PCT/US2011/029994 filed Mar. 25, 2011.
International Search Report and Written Opinion dated Aug. 13, 2013 for the corresponding International Application No. PCT/US2013/028669 filed Mar. 1, 2013.
International Search Report and Written Opinion dated Sep. 23, 2013 for the corresponding International Application No. PCT/US2013/049432 filed Jul. 5, 2013.
International Search Report and Written Opinion dated Oct. 10, 2013 for the corresponding International Application No. PCT/US2013/049427 filed Jul. 5, 2013.

* cited by examiner

LED LIGHTING APPARATUS WITH SWIVEL CONNECTION

CROSS REFERENCE TO RELATED APPLICATIONS

This application is a divisional application of U.S. patent application Ser. No. 11/961,701 filed on Dec. 20, 2007 and incorporated by reference herein in its entirety.

FIELD OF THE INVENTION

The present invention relates in general to light emitting diode assemblies that have a housing containing a plurality of light emitting diodes and that can be used to replace existing lamps.

BACKGROUND

Commercial lighting fixtures commonly use fluorescent lamps or incandescent lamps to give off light for illumination. These lighting fixtures have the common drawbacks of high power consumption, quick light attenuation, short service life, fragility, and the inability to be reclaimed. Light emitting diodes, hereinafter LEDs, may be used to replace fluorescent or incandescent bulbs to obtain the environmental and economic benefits of LED technology. However, LEDs are directional, and when used with existing light fixtures, they do not necessarily provide the illumination where it is needed.

Standard light tubes are mounted in a light fixture by sliding connector pins into end sockets and then turning the tube 90° so that the pins engage electrical contacts in the sockets. The lamp tube emits light omni-directionally and its orientation in the sockets is of no consequence, making orientation of pin connectors on different models of fixtures inconsequential. However, LEDs emit light generally at a narrowly-angled conical path. An LED lighting tube retrofitted into the existing light fixture may not be oriented to emit light in the desired direction as the angular presentation of the light to the surface to be illuminated can be offset by the variation of the pin connectors.

BRIEF SUMMARY

Disclosed herein are embodiments of light emitting diode (LED) lighting apparatus with swivel connections.

One embodiment of the LED lighting apparatus disclosed herein comprises a housing with at least one end, at least one light emitting diode extending along the housing, and at least one end cap. The end cap has an opening with a sidewall to cap the end of the housing and a surface opposite the opening and spanning the sidewall. At least two pin connectors extend from the surface and are connectable to a standard light fixture. The sidewall is configured to friction fit the housing such that the housing will rotate within the end caps with application of a rotational force after connection of the pin connectors to the light fixture.

Another embodiment of the LED lighting apparatus comprises a housing with at least one end, at least one light emitting diode inside the housing, at least one pin connector connectable to a standard light fixture and a gear member coupled to each of the at least one end of the housing. The housing is rotatable relative to the gear member to selectively align the at least one light emitting diode.

Yet another embodiment of the LED lighting apparatus comprises a housing having two ends, a gear member comprising a gear and a pawl, at least one light emitting diode extending along the housing, an end cap on each of the two ends of the housing and at least one pin connector connectable to a standard light fixture. The gear is located on one of the end cap and the housing, and the pawl is located in positional agreement with the gear on another of the end cap and the housing such that rotation of the housing moves the pawl within the gear to selectively align the at least one light emitting diode.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

According to teachings herein, an LED lighting apparatus may be used to replace fluorescent or incandescent bulbs in the existing light fixtures to obtain the environmental and economic benefits of LED technology, while providing illumination oriented to the desired surfaces or areas.

Embodiments of the LED lighting apparatus with swivel connectors are taught herein with reference to the accompanying drawings.

Figure 1:
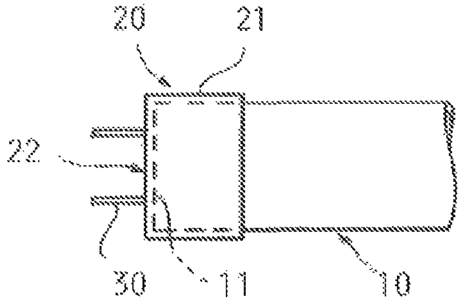
FIG. 1 illustrates a first embodiment of the LED lighting apparatus.

A first embodiment of the LED lighting apparatus with swivel connectors is illustrated in FIG. 1. The housing 10 for at least one LED (not shown) is depicted by broken lines. The end 11 of the housing 10 is capped with an end cap 20. The end cap 20 is friction-fitted onto the end of the housing. The end cap 20 has a sidewall 21 that surrounds the end 11 of the housing 10 and a surface 22 that spans the sidewall 21. From the surface 22 extend at least two pin connectors 30 that connect the housing to a standard fluorescent or incandescent light fixture (not shown). The pin connectors 30 are inserted into the socket or sockets of the lighting fixture. Once the pin connectors 30 are secure in the sockets of the light fixture, the housing 10 can be rotated relative to the end caps 20 with the application of rotational force on the housing. This rotational force can direct the light from the LEDs to illuminate the desired surface or area. The friction fit of the end cap 20 on the housing end 11 allows for rotation during application of force, with the housing maintaining the final position after rotational force is lifted.

As depicted, the housing is tubular with at least one end. The embodiments disclosed herein are not limited to such a housing. It is contemplated that the housing may be of any suitable shape that can be used with fluorescent or incandescent light fixtures. As a non-limiting example, the housing may be a shroud open along its length. The housing may have as many ends as necessary for a secure fit and the proper electrical connection. The housing may be made of any material known in the art to be used in the lighting industry, including but not limited to UV resistant plastic or glass.

Figure 8:
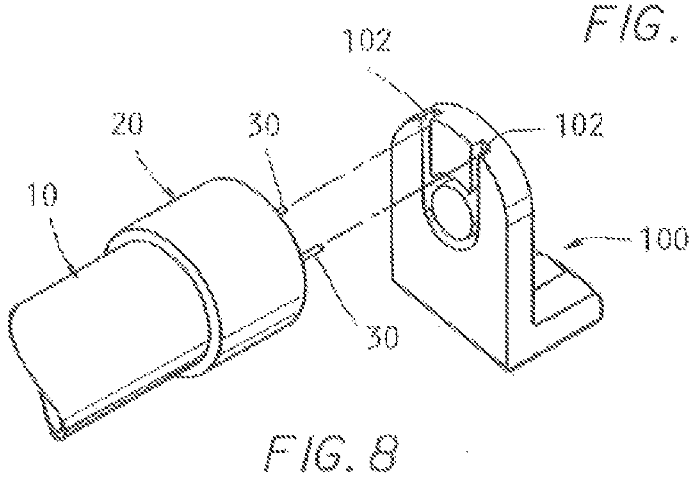
FIG. 8 is a fragmentary, perspective view of one embodiment showing one end of the housing with an end cap disconnected from a light tube socket of a lighting fixture.

FIG. 8 is a fragmentary, perspective view of the housing 10 with an end cap 20 disconnected from one end of a light tube socket 100 of a light fixture. As with conventional lighting systems, the light tube socket 100 includes a pair of electrical female connectors 102 for receiving the pin connectors 30 extending from the end cap 20.

The LEDs utilized in the lighting apparatus are those known in the art. More than one LED is commonly referred to as a bank or array of LEDs. Within the scope of these embodiments, the housing 10 may include one or more banks or arrays of LEDs mounted on one or more circuit boards. The LEDs can emit white light and, thus, are commonly referred to in the art as white LEDs. The LEDs can be mounted, for example, to one surface of the circuit board. The LEDs can be arranged on the circuit board or another surface to emit or shine white light through only one side of housing, thus directing the white light to a predetermined point of use, or arranged to emit light through more than one side of the housing. These examples are non-limiting and provided to further illustrate the housing with which the end caps are used.

Figure 2:
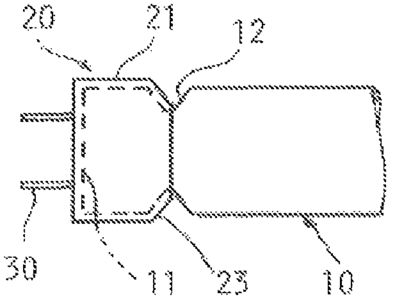
FIG. 2 illustrates a variation of the first embodiment of the LED lighting apparatus.

FIG. 2 illustrates a variation of the first embodiment of the LED lighting apparatus. In FIG. 2 the housing 10 has a crimp 12 along the circumference of the housing a distance in from the end 11 of the housing 10. The sidewall 21 of the end cap 20 has an inward angled edge 23 that is positioned to friction contact the housing 10 at the crimp 12. The end cap 20 and housing 10 are friction fit such that the rotational force that must be applied to align the LED light is greater than that force required to insert the housing 10 with end caps into the sockets of the lighting fixture (not shown). Thus, a force is required to insert the housing 10 into the fixture, and a greater force is required to adjust the housing 10 so that the desired surface or area is illuminated. Once adjustment is complete and the force is lifted, the housing 10 maintains its position due to the friction fit with the end cap 20.

Figure 3:
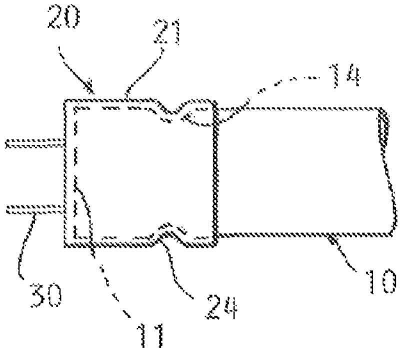
FIG. 3 illustrates another variation of the first embodiment of the LED lighting apparatus.

FIG. 3 is yet another variation of the first embodiment of the LED lighting apparatus. In FIG. 3, the housing 10 has a crimp 14 along the circumference of the housing a distance in from the end 11 of the housing 10. The sidewall 21 of the end cap 20 has a friction contact portion 24 located on the sidewall and running the circumference of the sidewall. The friction contact portion 24 is positioned to many the crimp 14 of the housing 10 when the end cap 20 is capping the end 11 of the housing 10. The friction fit between the end cap 20 and the housing 10 is such that the rotational force that must be applied to align the LED light is greater than that force required to insert the housing end cap(s) into the sockets of the lighting fixture. Thus, a force is required to insert the housing 10 into the fixture, and a greater force is required to adjust the housing 10 so that the desired surface or area is illuminated. Once adjustment is complete and the force is lifted, the housing 10 maintains its position due to the friction fit.

The friction fit may be obtained by crimping or other means such as press-fitting. These are non-limiting examples and other means are contemplated.

Figure 4:
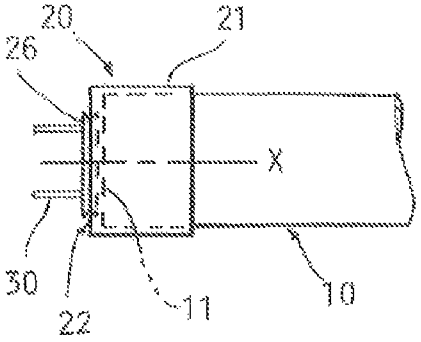
FIG. 4 illustrates a second embodiment of the LED lighting apparatus.

A second embodiment of the LED lighting apparatus is illustrated in FIG. 4. Elements of the second embodiment having the same function as in the first embodiment are denoted by the same reference numerals and duplicate explanations thereof are omitted herein.

In FIG. 4, the housing 10 for at least one LED (not shown) is again depicted by broken lines. The end 11 of the housing 10 is capped with an end cap 20. The end cap 20 has a sidewall 21 that surrounds the end 11 of the housing 10 and a surface 22 that spans the sidewall 21. Located within the surface 22 is a pin pivot disk 26 coupled to the surface 22. The pin pivot disk 26 is coupled so that it can pivot around an axis X relative the end cap 20. From the pin pivot disk 26 extend at least two pin connectors 30 that connect the housing to a standard fluorescent or incandescent light fixture. The pin connectors 30 are inserted into the socket or sockets of the lighting fixture and are locked into place.

In this embodiment, the end cap 20 and housing 10 do not move relative to each other. Once the pin connectors 30 are inserted into the socket of the fixture (not shown), the housing 10 and end cap 20 can be aligned relative to the pin pivot disk 26 and fixture by the application of a rotational force on the housing 10 or end cap(s) 20. The housing 10 and end cap(s) 20 remain in the desired alignment when the force is lifted.

Figure 5:
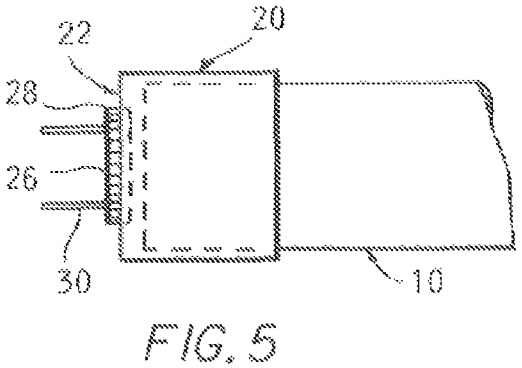
FIG. 5 illustrates a variation of the second embodiment of the LED lighting apparatus.
Figure 5A:
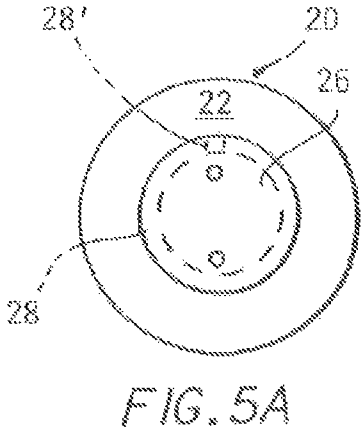
FIG. 5A is a view of the face of an end cap alternative for the second embodiment of the LED lighting apparatus.

FIG. 5 depicts a variation of the second embodiment of the LED lighting apparatus disclosed herein. In this variation of the second embodiment, the pin pivot disk 26 is a ratchet gear. The edge 28 of the surface 22 into which the ratcheted pin pivot disk 26 is coupled acts as the pawl of the ratchet. The edge 28 may have a different configuration from that shown in FIG. 5. For example, it may be thicker than the typical edge of the surface 22, or it may be of a different material. FIG. 5A illustrates the surface 22 of the end cap 20 shown without the pivot disk 26, the edge 28 having a pawl 28' extending from it, rather than the edge 28 itself being configured as a pawl.

Again in this variation the end cap 20 and housing 10 do not move relative to each other. Once the pin connectors 30 are inserted into the socket of the fixture (not shown), the housing 10 and end cap 20 can be aligned relative to the ratcheted pin pivot disk 26 and fixture by the application of a rotational force on the housing 10 or end cap(s) 20 that moves the pawl 28' (or edge 28 of the surface 22) relative to the ratchet gear (pin pivot disk 26). The housing 10 and end cap(s) 20 remain in the desired alignment when the force is lifted. To achieve this, either the pawl 28' or the teeth of the ratchet gear (pin pivot disk 26) is flexible such that the rotation of the housing 10 and end cap(s) 20 is allowed while maintaining the pin connectors 30 in the socket.

Figure 6:
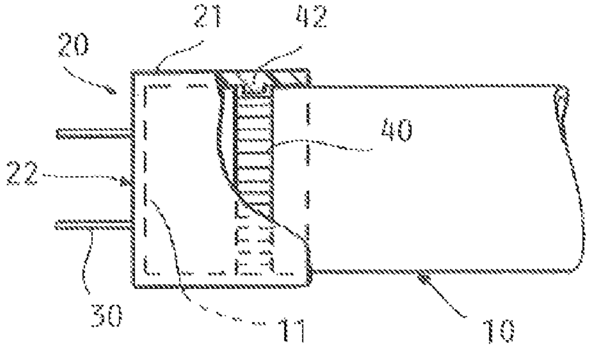
FIG. 6 illustrates a third embodiment of the LED lighting apparatus.

A third embodiment of the LED lighting apparatus with swivel connections is illustrated in FIG. 6. In FIG. 6, the housing 10 for at least one LED (not shown) is again depicted by broken lines. The end 11 of the housing 10 is capped with an end cap 20. The end cap 20 has a sidewall 21 that surrounds the end 11 of the housing 10 and a surface 22 that spans the sidewall 21. Extending from the surface 22 are at least two pin connectors 30 that connect the housing to a standard fluorescent or incandescent light fixture (not shown). The pin connectors 30 are inserted into the socket or sockets of the lighting fixture.

In FIG. 6 the housing 10 has a ratchet gear 40 positioned a distance in from the end 11 of the housing 10. The ratchet gear 40 is positioned so that the teeth of the gear are flush with the housing 10. The sidewall 21 of the end cap 20 has a pawl 42 that is positioned to correspond to the ratchet gear 40 when the end cap 20 is positioned on the end 11 of the housing 10. The end cap 20, after the pin connectors 30 are inserted into the socket, does not move relative to the lighting fixture. During insertion of the pin connectors with rotational movement, the pawl 42 is positioned to rotate against the teeth of the ratchet gear 40. Thus resistance against the teeth is high. Once the pin connectors 30 are inserted, the housing 10 can be aligned relative to the end cap 20 and fixture by the application of a rotational force on the housing 10 that moves the ratchet gear relative to the pawl 42, with the pawl 42 moving with the teeth of the ratchet gear 40. The housing 10 and end cap(s) 20 remain in the desired alignment when the force is lifted. To achieve this, either the pawl 42 or the teeth of the ratchet gear 40 is flexible such that the rotation of the housing 10 is allowed after the pin connectors 30 are inserted.

Figure 7:
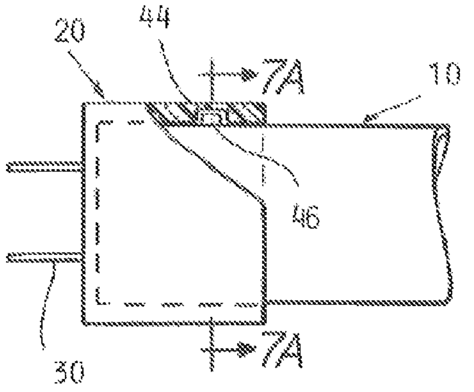
FIG. 7 illustrates a variation of the third embodiment of the LED lighting apparatus.
Figure 7A:
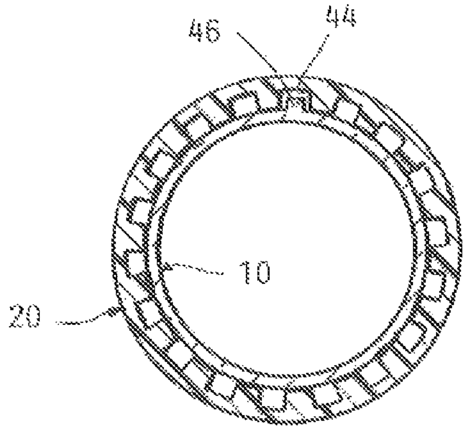
FIG. 7A illustrates the cross sectional view of the end cap across lines A-A' shown in FIG. 7.

FIG. 7 illustrates a variation of the third embodiment of the LED lighting apparatus. In this variation, the pawl 46 is positioned on the exterior of the housing 10 a distance from the end 11. The ratchet gear, shown in FIG. 7A, is integral to the end cap 20 and positioned so that when the end cap 20 is capping the end 11 of the housing 10, the pawl 46 and the ratchet gear are in alignment. FIG. 7A is a cross sectional view of the end cap 20 along line A-A' of FIG. 7 illustrating the position of the ratchet gear 44. The end cap 20, after the pin connectors 30 are inserted into the socket, does not move relative to the lighting fixture. During insertion of the pin connectors with rotational movement, the pawl 46 is positioned to rotate against the teeth of the ratchet gear 44. Thus resistance against the teeth is high. Once the pin connectors 30 are inserted, the housing 10 can be aligned relative to the end cap 20 and fixture by the application of a rotational force on the housing 10 that moves the ratchet gear relative to the pawl 46, with the pawl 46 moving with the teeth of the ratchet gear 44. The housing 10 and end cap(s) 20 remain in the desired alignment when the force is lifted. Again, either the pawl 46 or the teeth of the ratchet gear 44 is flexible such that the rotation of the housing 10 is allowed after the pin connectors 30 are inserted.

With any of the embodiments of the LED lighting apparatus disclosed herein, it is contemplated that means to limit the available rotation of the LED housing or housing and end cap may be incorporated. By limiting the available rotation of the housing and/or the end cap, the wires connected from the pins to the LED array are not twisted and strained. This, in turn, should decrease wear and lengthen the life of the electrical connection so that the advantage of extended life of the LEDs can be further realized.

Figure 9:
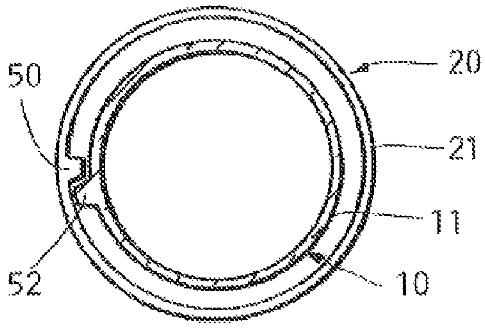
FIG. 9 illustrates an embodiment of an over-rotation prevention device.

One way in which to avoid over-rotation of the housing 10 for the first and third embodiments, and over-rotation of both the housing 10 and end caps 20 of the second embodiment, is to provide a stop in the end cap 20 and a corresponding stop in the housing. As illustrated in FIG. 9, a stop 50 extends from the inside of the sidewall 21 of the end cap 20. A corresponding stop 52 extends from the housing 10 at a position on the end 11 such that the stops 50, 52 will engage one another at one point during rotation. The stops 50, 52 can be made from any material that is strong enough to withstand the rotational force applied by a user of the lighting apparatus.

Alternative configurations of the stop are contemplated. One such example involving the ratchet of the second embodiment incorporates locating teeth in only a portion of the ratchet gear 40, 44 so that the pawl is prevented from further rotation along the ratchet gear 40, 44. Based on the teachings herein, it should be recognized by those skilled in the art that these stop configurations are provided by way of example and not limitation, and that other suitable stop configurations may be used.

Figure 10:
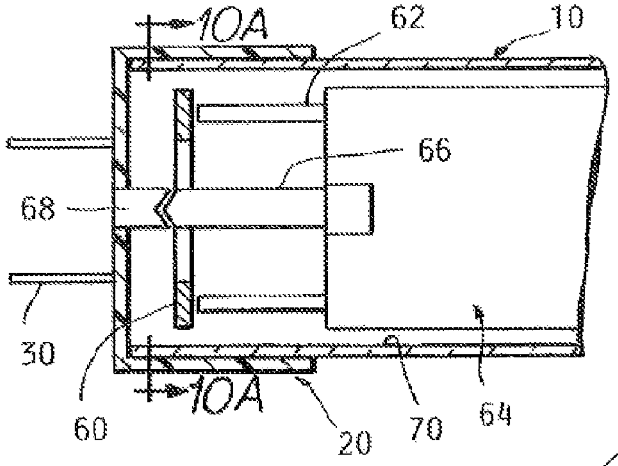
FIG. 10 illustrates another embodiment of an over-rotation prevention device.
Figure 10A:
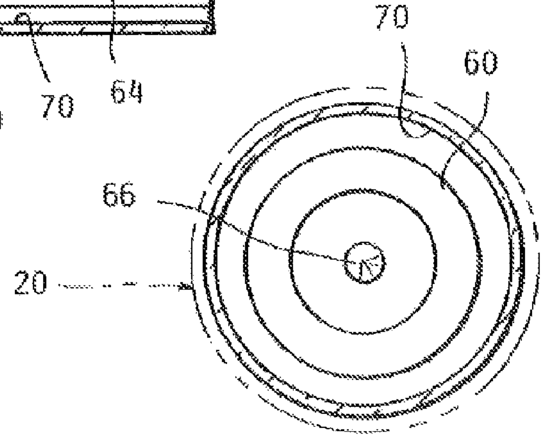
FIG. 10A is a cross-sectional view of the device of FIG. 10.

Other ways to prevent twisting of the electrical connections due to rotation of the housing 10 or housing 10 and end cap 20 may be used. One such embodiment incorporates the use of slip rings as illustrated in FIG. 10. The slip ring 60 comprises a conductive circle or band mounted within the housing 10. Electrical connections 62 from the LED array or LED circuit board 64 are made to the slip ring 60 and are omitted here for clarity. A spring loaded center contact 66, located along the center axis of the housing 10, transfers the electrical power from a socket 68 configured in the end cap 20, which in turn transfers the electrical power from the pins 30 that are inserted into the socket of the fixture (not shown in FIG. 10). The electrical connections 62 may also be spring loaded. As used herein, a slip ring is an electrical connection through a rotating assembly. Accordingly, alternative constructions of such a slip ring are possible and can include, for example, rotary electrical interfaces, rotating electrical connectors, collectors, swivels, electrical rotary joints, etc. FIG. 10A is a cross-sectional view of the housing 10 along dotted line 10A, showing the slip ring 60 positioned within the housing wall 70, with the spring loaded center contact 66 at the center. The end cap is omitted from FIG. 10A.

Figure 11:
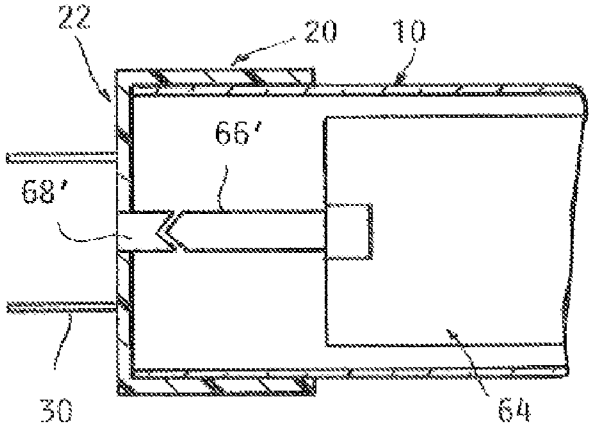
FIG. 11 is an illustration of an over-rotation device for a single socket fixture.

FIG. 11 is an alternative embodiment of the electrical connection over-rotation prevention for housings with only one electrical connection, rather than the two connections used with a traditional fluorescent fixture. In FIG. 11, the electrical connections (not shown) from the LED array or circuit board 64 are connected to a spring loaded contact pin 66' located along the center axis of the housing 10. A socket 68' in the center of the end cap 20 surface 22, which draws electrical power through the pins 30 of the end cap 22, is in contact with the spring loaded contact pin 66'. Since the electrical connections to both the socket 68' and the spring loaded contact pin 66' do not rotate relative to the connection points, strain and stress on the connections are reduced.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An LED lighting apparatus configured as a single package sized for use in a light fixture with a socket, comprising:

a housing with at least one end;

a connector rotatably connectable to the socket, the connector located at the at least one end of the housing, such that the housing and the connector in conjunction at least partially define the package;

at least one light emitting diode inside the housing; and a gear member coupled to the at least one end of the housing, wherein the housing is selectively rotatable relative to the gear member by the application of a rotational force to align the at least one light emitting diode with respect to the connector, the rotational force being greater than that for rotatably connecting the connector to the socket.

2. The apparatus of claim 1, further comprising an end cap carrying the connector over the at least one end, the end cap having a surface perpendicular to a longitudinal axis of the housing on which the gear member is coupled.

3. The apparatus of claim 2, wherein the gear member is located within an aperture of the surface, the gear member comprising a ratchet gear and a pawl formed from an edge of the surface forming the aperture.

4. The apparatus of claim 3, wherein the pawl extends from the edge of the surface into the aperture, the pawl configured to move against the ratchet gear as the housing is rotated.

5. The apparatus of claim 3, wherein the connector extends from the edge of a disk coupled to the end cap for rotation within the aperture, the ratchet gear is formed on an edge of the disk and the pawl extends from the edge of the surface into the aperture for movement against the ratchet gear as the housing is rotated, the gear member and the connector configured to be stationary after the connector is connected to the fixture.

6. The apparatus of claim 3 further comprising a first projection extending from the end cap and a second projection extending from the housing each positioned such that the first and second projections will contact each other to prevent over-rotation of the housing.

7. The apparatus of claim 1, further comprising end cap carrying the connector over the at least one end, the end cap having a surface on which the gear member is coupled.

8. The apparatus of claim 7, wherein the gear member comprises a ratchet gear and a pawl, with the ratchet gear located on the housing and the pawl located on the end cap.

9. The apparatus of claim 8, wherein the ratchet gear is embedded in the housing and the pawl extends from an overlying side wall of the end cap.

10. The apparatus of claim 8, wherein the connector extends from a surface of the end cap perpendicular to a longitudinal axis of the housing.

11. The apparatus of claim 7, wherein the gear member comprises a ratchet gear and a pawl, with the ratchet gear located on the end cap and the pawl located on the housing.

12. The apparatus of claim 11, wherein the pawl extends from a surface of the housing and the ratchet gear is located on an overlying side wall of the end cap.

13. The apparatus of claim 8, wherein the housing is rotatable within the end cap to selectively align the at least one light emitting diode.

14. An LED lighting apparatus comprising:

an elongate housing having a first end and a second end;

a gear member coupled to the first end of the housing, the gear member comprising a gear and a pawl;

at least one light emitting diode extending along the housing;

a first end cap on the first end of the housing and a second end cap on the second end of the housing; and a first pin connector and a second pin connector, each rotatably connectable to a respective socket of a standard light fixture, the first pin connector located at the first end of the housing and the second pin connector located at the second end of the housing, such that the housing, the first pin connector and the second pin connector in conjunction at least partially define a single package sized for replacing a fluorescent tube in the light fixture, wherein:

the gear is located on one of the first end cap and the housing, and the pawl is located in positional agreement with the gear on another of the first end cap and the housing such that selective rotation of the housing by the application of a rotational force moves the pawl against the gear to align the at least one light emitting diode, the rotational force being greater than that for rotatably connecting the first connector to its respective socket.

15. The apparatus of claim 14, wherein the first end cap has a side wall overlying the first end of the housing and an end wall over the first end, and the gear is located on an interior of the side wall of the end cap with the pawl extending from a surface of the first end.

16. The apparatus of claim 14, wherein the first end cap has a side wall and an end wall, and the gear is located on the end wall of the first end cap.

17. The apparatus of claim 16, wherein the gear is located in an aperture of the end wall and the pawl extends from an edge of the end wall forming the aperture.

18. The apparatus of claim 17, wherein the gear only has teeth around a portion of a circumference of the edge to limit rotation of the housing.

19. The apparatus of claim 14 further comprising a first projection extending from the first end cap and a second projection extending from the housing each positioned such that the first and second stops will contact each other to prevent over-rotation of the housing.

20. An LED-based configured as a single package for replacing a fluorescent light tube in a light fixture with a socket, comprising:

an elongate housing with opposing ends;

a connector rotatably connectable to the socket, the connector located at an end of the housing, such that the housing and the connector in conjunction at least partially define the package;

at least one light emitting diode inside the housing; and a gear member coupled between the connector and the at least one light emitting diode, the gear member configured to permit selective rotation of the connector relative to the at least one light emitting diode under the application of a rotational force to selectively align the at least one light emitting diode at a plurality of orientations with respect to the connector, the rotational force bring greater than that for rotatably connecting the connector to a socket.

* * * * *